US006975995B2

(12) United States Patent
Kim

(10) Patent No.: US 6,975,995 B2
(45) Date of Patent: Dec. 13, 2005

(54) NETWORK BASED MUSIC PLAYING/SONG ACCOMPANYING SERVICE SYSTEM AND METHOD

(75) Inventor: Yun-Jong Kim, Seoul (KR)

(73) Assignees: Hanseulsoft Co., Ltd., Seoul (KR); P&IB Co., LTD, Seoul (KR)

( * ) Notice: Subject to any disclaimer, the term of this patent is extended or adjusted under 35 U.S.C. 154(b) by 476 days.

(21) Appl. No.: 10/168,300

(22) PCT Filed: Dec. 20, 2000

(86) PCT No.: PCT/KR00/01498

§ 371 (c)(1),
(2), (4) Date: Jun. 20, 2002

(87) PCT Pub. No.: WO01/46829

PCT Pub. Date: Jun. 28, 2001

(65) Prior Publication Data

US 2003/0014262 A1    Jan. 16, 2003

(30) Foreign Application Priority Data

Dec. 20, 1999  (KR) ............................... 1999-59517
Jul. 7, 2000    (KR) ............................... 2000-38911

(51) Int. Cl.[7] ........................ G10L 15/00; G09B 15/04
(52) U.S. Cl. ........................ 704/278; 84/610; 709/217
(58) Field of Search ........................ 84/610; 709/217; 704/278

(56) References Cited

U.S. PATENT DOCUMENTS

| 5,900,564 | A  | * | 5/1999  | Kurakake ..................... 84/477 |
| 5,980,261 | A  | * | 11/1999 | Mino et al. ................. 434/307 |
| 6,083,009 | A  | * | 7/2000  | Kim et al. ............... 434/307 A |
| 6,548,747 | B2 | * | 4/2003  | Shibata et al. ................ 84/609 |
| 6,691,149 | B1 | * | 2/2004  | Yokota et al. .............. 709/201 |

* cited by examiner

*Primary Examiner*—Daniel Abebe
(74) *Attorney, Agent, or Firm*—Mayer, Brown, Rowe & Maw LLP

(57) ABSTRACT

A system and method for providing a service of playing an accompaniment/musical performance is disclosed. In order to embody the system and method for providing the service of playing the accompaniment/musical performance, virtual orchestra system (VOS) files, which is converted from digital music files, e.g., musical instrument digital interface (MIDI) files and includes play order notes and sound data for each musical instrument capable of being played, are used. A server provides the VOS files through a network, e.g., a local area network (LAN), an Intranet, a value added network (VAN), an Internet or a public switched telephone network. A music is selected by a user through at least a client terminal. The play order note for each musical instrument is provided and the sound data for each musical instrument is played based on the play order note, thereby playing in solo or in concert. (At this time, sound for the others musical instrument is silent or used as a background music.) Lyric texts are provided along with the play order notes, thereby being capable of playing a solo voice/instrument or an ensemble voice/instrument.

92 Claims, 17 Drawing Sheets

NETWORK BASED MUSIC PLAYING/SONG ACCOMPANYING SERVICE SYSTEM AND METHOD

This is a nationalization of PCT/KR00/01498, filed Dec. 20, 2000 and published in English.

TECHNICAL FILED

The present invention relates to a system and a method for a network based musical performance/accompaniment service, especially for solo and/or vocal solo services, or the concert and/or chorus services for the distributed users, using the VOS (hereinafter, refereed to as a Virtual Orchestra System) file, which is converted from a digital musical file (such as, a MIDI file) to make a direction of performance and play back for each musical instrument, and a computer readable medium storing programs for realizing them.

BACKGROUND ART

Generally, as accompaniment means of making sounds of various musical instruments or something for singers, an electric accompaniment played back by electronic sounds processing devices replaces a lot of manual accompaniment with the development of the electronic engineering.

These devices offer accompaniment by synthesizing and signalizing the digital sound module for some musical instruments excluding human voice.

These days, a noraebang (karaoke) service, which integrates these electronic devices with television, and gives singers the lyric texts with background videos on TV for amusement, is common.

These accompaniment devices include memory devices storing accompaniment data for many songs, and have to update the memory devices for the latest songs.

For the portability of such accompaniment devices to accompany in outdoors, some portable devices storing the data for some songs are wired or wirelessly connected with an amplifier or TV. However, it is not easy to update the data for the latest song, therefore the devices have to be replaced by the new devices for the latest songs on regular basis.

As the development of the digital data communication and Internet, people easily download the, favorite songs, which are digitalized files including not only the accompaniment data but also the singers' voice data, and listen to them through their computer system with a sound card.

Especially, the various types of musical data in data communication networks, such as Internet, are easy to process and convert according to users' demand and equipment's need.

Lately, MP3 file is very popular, which is a compressed musical file downloaded from networks and is transmitted to a portable device through cable for playing back, but, it requires a lot of memory capacity 3 to 5 Mega bytes for 1 song) and the transmission speed is too slow.

MIDI (Musical Instrument Digital Interface) is a kind of music file, which can automatically play back sounds, or music through the electronic devices, and it has international standards for the compatibility of the data exchange among electronic musical instruments. Most electronic musical instruments can send/receive the data based on MIDI standards. For example, the electronic musical instruments for domestic use are divided into the electronic organ, the electronic piano, the electronic keyboard, etc. and these instruments, that synthesize and output sound waves using the well-known analog or digital circuit, also follows the MIDI standards.

In other words, MIDI has been considered as international standards for the compatibility in transmitting information on playing of musical instruments, and it recommends the dedicated five-pin cable for sending/receiving channel and system messages. Also, MIDI recommends that the channel message may include the performance information, such as scale, interval, dynamic and transformation of timbre programs, etc.

Recently, there are many cases where the data can be shared with PCs (Personal Computers), and the electronic musical instruments can be controlled by the PCs. For the PCs to control the musical instruments with a MIDI port, the signals in the PC are required to be converted into MIDI signals for electronic musical instruments, and then the MIDI interface is necessarily required for this purpose. The MIDI interfaces may be divided into the intelligent type with CPU and the non-intelligent type without it. In the present techniques, sixteen-different channel information can be transmitted through just one cable, therefore the MIDI file, which has the sounds of sixteen different musical instruments, can be easily transmitted (it is obvious that the extension of the channel information is available to the ordinary skilled in the art).

The present invention is suggested as a technique using these environments and resources.

As a prior art, "Beatmania" (it is the brand name) system of "KONAMI", which is well known as a music playing game system, will be explained concretely.

The Beatmania system is an off-line game system, which directs a playing operation to users at a predetermined point of time and, when the users get into operation based on the direction, it executes the manipulation such as a mixing of a preset playing sound wave (user input sound wave) and an effect sound wave (background music except the user input sound wave) given by Disc Jockey (DJ). It directs the timing of playing operation to the user using an indicator, a kind of electronic musical score, and the user can play the music with five buttons and one turntable.

According to the result of user's playing operation, "Beatmania" synthesizes and outputs the play sound wave and the effect sound wave.

Although, this "Beatmania" system is useful in that it makes the user play the music easily by indicating the timing of playing operations, it requires a lot of efforts for professional musicians to compose the whole piece of music, because in the "Beatmania" system, the playing sound wave to be selected by a user for a candidate musical instrument, and the rest sound wave (background sounds) for the rest of the candidate musical instrument should be separately designed for each candidate musical instrument selected by the user. That is, in this system, the design of the playing sound wave (user input wave) and the background sound wave should be repeatedly made as many as the number of musical instruments to be selected by the user, because it is impossible to design the whole music at one time by partitioning the musical notes depending on each musical instrument.

Also it has another problem in that once the music is made for "Beatmania", the change of the file requires the same complicated procedures as the file is first made, because the musical performance file made through these procedures is a wave file.

Even if the musical performance file is compressed, it needs a few or a few dozens of megabyte because the file for the music playing game through these procedures is wave file, and, therefore the transmission of it needs large bandwidth. In result, in the current PC version, "Beatmania" has a technical limitation to be confined to off-line system, or to downgrade sound quality due to the reduction of an amount of data.

In the prior art such as "Beatmania" system, since it plays back only the wave type of the music independently stored in the game system, basically, it cannot provide on-line services such as a concert function for plural users on networks, chatting function, or evaluation function

DISCLOSURE OF THE INVENTION

Therefore, to solve the above problems an object of the present invention to provide a system and a method for network based musical performance/accompaniment service, especially for solo and/or vocal solo services, or concert and/or chorus services for the distributed users, using the VOS file, which is converted from a digital musical file (such as, a MIDI file) to make a direction of performance and playing back for each musical instrument, and a computer readable medium storing programs for realizing them.

It is another object of the present invention to provide a team playing service (concert/chorus) and a rank service (personal or team) using on-line chatting among members.

The musical performance service system of the present invention comprises musical performance service providing means for providing musical performance file, musical performance service programs, and musical playing functions for at least one user; and at least one musical performance executing means connected with said musical performance service providing means through communication networks for downloading said musical performance file and said musical performance service programs, and playing a music.

The musical performance server through communication networks such as Internet, to achieve the purpose of the present invention comprises: program storing means for storing musical playing service programs and, providing the musical performance service programs to said service control means in response to service control means; musical file storing means for classifying and storing said musical performance file based on genre, and providing the musical performance file requested by said musical performance executing means to said service control means; first networking means connected with at least one musical performance executing means for transmitting said musical performance file and said musical performance service programs to said at least one musical performance executing means; service control means for controlling musical performance service, transmitting the musical performance file and musical performance service programs requested by said at least one musical performance executing means to said first networking means; and storing means for storing information on said at least one musical performance executing means and musical performance file stored in said file storing means, and evaluation data for each musical instrument for the selected music.

Also the musical performance server further comprises multiplex concert means for offering an environment where said at least one musical performance executing means play in a concert by selecting a music and the musical instruments, and generating total playing data by integrating personal playing data of plural users The musical playing terminal to achieve the purpose of the present invention comprises: first networking means, connected with said musical performance service providing means through communication networks, for receiving said musical performance file and said musical performance service programs from said musical service providing means; musical file providing means for providing musical performance file received through said first networking means; displaying means for displaying electronic musical notes for musical instruments to be played as an electronic musical score that shows playing orders of the notes on a screen; at least one input means for getting a playing operation input from users according to the playing orders of the notes in the electronic musical score on said displaying means; musical performance processing means for installing and executing said musical performance service programs received through said first networking means, storing said musical performance file, converting the notes of said musical performance file for musical instruments to be played into the electronic musical score representing the playing orders, and providing the notes to said displaying means, and generating designated sounds manipulated by said at least one input means and background sounds excluding the designated sounds; musical playing means for synthesizing the designated sounds and the background sounds from said musical performance processing means and playing it back; and output means for outputting the sounds played back by said musical playing means.

The accompaniment service system to achieve the purpose of the present invention comprises: accompaniment service providing means for providing accompaniment file, accompaniment service programs and accompanying functions for at least one user; and at least one song executing means connected with said accompaniment service providing means through communication networks for downloading said accompaniment file and said accompaniment service programs.

The accompaniment server to achieve the purpose of the present invention comprises: program storing means for storing accompaniment service programs; musical file storing means for classifying and storing said accompaniment file based on genres; first networking means connected with said at least one song executing means for transmitting said accompaniment file and said accompaniment service programs to said at least one song executing means; service control means for receiving the accompaniment service programs from the program storing means and the accompaniment file from the musical file storing means in orders to control an accompaniment service required by at least one song executing means, and transmitting the accompaniment file and accompaniment service programs, which are requested by said at least one song executing means, to said first networking means; and storing means for storing information on said at least one song executing means and accompaniment file stored in said file storing means, and evaluation data for each singer and whole chorus playing for the selected music.

Also the accompaniment server further includes multiplex chorus means for offering musical environments where said at least one song executing means play in chorus for the selected music, and generating total singing data by integrating personal singing data of plural users.

The accompaniment terminal to achieve the purpose of the present invention comprises: first networking means, connected with an accompaniment service providing means through communication networks, for receiving an accompaniment file and an accompaniment service programs from said accompaniment service providing means; musical file providing means for providing said accompaniment file received through said first networking means; displaying means for displaying lyric texts and singing orders in said accompaniment file; user input means for getting a voice input of a singer according to the singing orders displayed on said displaying means; accompaniment processing means for installing and executing said accompaniment service programs received through second networking means, storing said accompaniment file, providing the lyric texts and the singing orders in said accompaniment file to said displaying means, and excluding voice sounds of the singer inputted through said user input means and generating accompaniment sounds; musical playing means for synthesizing the voice sounds of singers and the accompaniment sounds from said accompaniment processing means and playing it back; and output means for outputting the sounds played back by said musical playing means.

The musical performance service method to achieve the purpose of the present invention comprises: a first step of generating, in a musical performance server, a musical performance file representing notes for each musical instrument in a timing of playing operation by partitioning notes based on the playing orders and the musical instruments; a second step of executing user authentication process when users try to log in for getting a musical performance service through said communication networks; a third step of providing, in said musical performance server, musical performance file, musical performance service programs to a musical performance terminal through said communication networks in case the users are authorized according to the result of said second step; and a forth step of providing, in said musical performance server, the musical performance service through said communication networks in case the users are authorized according to the result of said second step.

Also the musical performance service method further includes a fifth step of inquiring or modifying, in said musical performance server, user information in case the users are authorized according to the result of said second step.

The accompaniment service method to achieve the purpose of the present invention comprises: a first step of generating, through accompaniment server, a musical performance file representing notes for each musical instrument in a timing of playing operation by partitioning notes based on the playing orders and the musical instruments, and an accompaniment file representing lyric texts, singing orders, and accompaniment sounds by inserting sync between the lyric texts and the beat to said musical performance file; a second step of executing user authentication process when the users try to log in for getting accompaniment service through said communication networks; a third step of providing, in said accompaniment server, said accompaniment file, accompaniment service program to said accompaniment terminal through said communication networks in case the users are authorized according to the result of said second step; and a forth step of providing, in said accompaniment server, a musical performance service through communication networks in case the users are authorized according to the result of said second step.

Also, the accompaniment service method further comprises, a fifth step of inquires or modifies, in said accompaniment server, user information in case the users are authorized according to the result of said second step.

A first medium to achieve the purpose of the present invention provides a computer readable medium storing program codes for realizing: a first function of generating, in a musical performance server, a musical performance file representing notes for each musical instrument in a timing of playing operation by partitioning notes based on the playing orders and the musical instruments; a second function of executing user authentication process when users try to log in for getting a musical performance service through said communication networks; a third function of providing, in said musical performance server, musical performance file, musical performance service programs to a musical performance terminal through said communication networks in case the users are authorized according to the result of said second function; and a forth function of providing, in said musical performance server, the musical performance service through said communication networks in case the users are authorized according to the result of said second function.

Also the first medium provides a computer readable medium storing program codes for realizing a fifth function of inquiring or modifying user information in case the users are authorized according to the result of said second step.

A second medium to achieve the purpose of the present invention provides a computer readable medium storing program codes for realizing: a first function of generating, through accompaniment server, a musical performance file representing notes for each musical instrument in a timing of playing operation by partitioning notes based on the playing orders and the musical instruments, and an accompaniment file representing lyric texts, singing orders, and accompaniment sounds by inserting sync between the lyric texts and the beat to said musical performance file; a second function of executing user authentication process when the users try to log in for getting accompaniment service through said communication networks; a third function of providing, in said accompaniment server, said accompaniment file, accompaniment service program to said accompaniment terminal through said communication networks in case the users are authorized according to the result of said second function; and a forth function of providing, in said accompaniment server, a musical performance service through communication networks in case the users are authorized according to the result of said second function.

Also the second medium provides a fifth function that the musical performance server inquires or modifies the user information in case the users are authorized according to the result of said second function.

In the present invention, the VOS file is provided by the server through the communication networks, such as LAN (Local Area Network), Intranet, VAN (Value Added Network), Internet and PSTN, or the converting program for the VOS file is distributed to the members' clients terminals through the networks, therefore, the playing operation data of the selected music for each musical instrument are provided to the users on at least one client terminal, and the solo/concert function is realized by playing back the sound of the musical instruments (the sounds of unselected musical instruments are provided as background sounds or muted).

In addition to providing the playing operation data, the lyric texts synchronized with the playing operation data are also displayed on screen simultaneously, and the users on at least one client terminal are able to play in solo/vocal solo or concert/chorus.

Through the present invention, a noraebang service (karaoke service) can be implemented not only in business facilities but also in house or office, and ordinary people not skilled in real musical instruments can play for the selected music.

The users can play in concert by making a virtual vocal studio through the networks, without any expensive real musical instruments or studio.

Also, ordinary people without professional knowledge can make a melody (hereinafter, direct sequencing) by downloading the converting program for the VOS file through the networks.

Described as above, in the present invention, using communication networks such as Internet, one or more players select each their own musical instrument, and play in solo/vocal solo or concert/chorus according to an electronic score on a screen.

For this purpose, the VOS format is generated from MIDI file or by direct sequencing, which is an electronic score file for each player. For the users of noraebang service, the VOS file with sync between the lyric texts and the beat is offered, while for the users of musical instrument performance service, the electronic score for the selected musical instruments is offered at a real time. Then, the users play in vocal solo/chorus, or in solo/concert according to the electronic score.

In the Best mode for Carrying Out the Invention, the method of converting a MIDI file, which is a well-known digital musical file, to the VOS file and the using method of it is explained concretely.

For the accompaniment file for the noraebang service, the sync between the lyric texts and the beat is inserted to the VOS (Virtuual Orchestra System) file, and the lyric texts are provided to users sequentially according to the playing order.

BEST MODE FOR CARRYING OUT THE INVENTION

Figure 1:
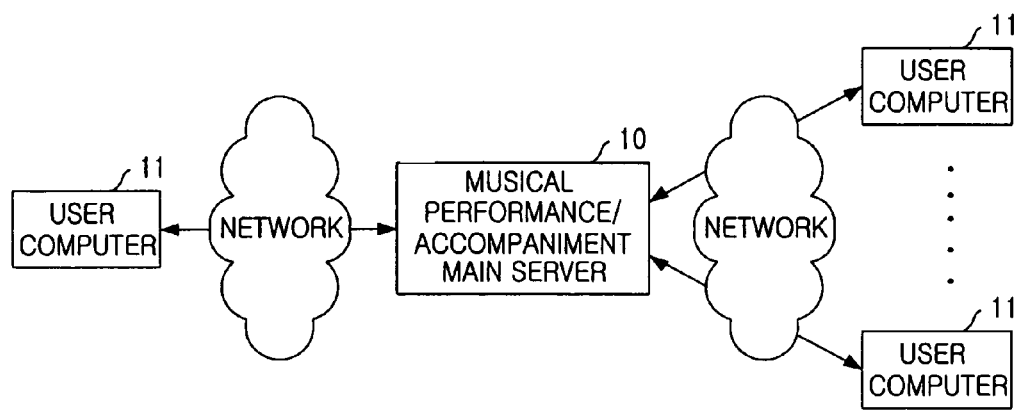
FIG. 1 is a schematic diagram illustrating an embodiment of a musical performance/accompaniment service system in accordance with the present invention.

FIG. 1 is a schematic diagram illustrating an embodiment of a musical performance/accompaniment service system in accordance with the present invention.

As illustrated in FIG. 1, the musical performance/accompaniment service system in accordance with the present invention includes: a musical performance/accompaniment main server 10 providing the VOS (Virtual Orchestra System) file representing notes for each musical instrument in the timing of playing operation by partitioning notes based on the playing order and the musical instruments, a noraebang music file representing the lyric texts, a singing order, an accompaniment sound by inserting sync between a lyric texts and a beat to the VOS (Virtual Orchestra System) file, and a chorus/concert function for plural users using musical performance/accompaniment service program; and a user computer 11 connected with the musical performance/accompaniment main server through communication networks, such as PSTN or Internet, for downloading, installing and storing the VOS musical file, accompaniment (noraebang) file, and musical performance/accompaniment service program, and executing the chorus/concert function for plural users.

Figure 2:
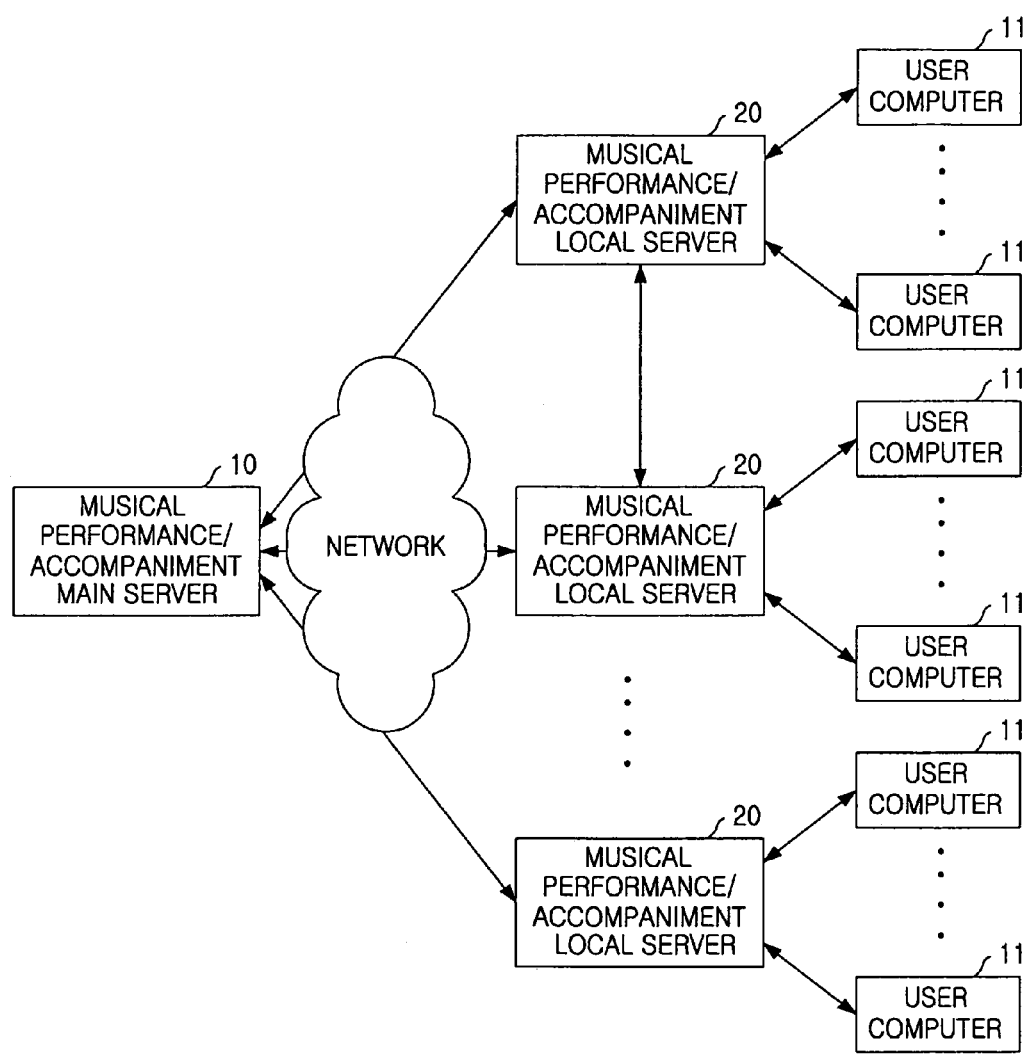
FIG. 2 is a schematic diagram illustrating another embodiment of a musical performance/accompaniment service system in accordance with the present invention.

FIG. 2 is a schematic diagram illustrating another embodiment of a musical performance/accompaniment service system in accordance with the present invention.

As illustrated in FIG. 2, the musical performance/accompaniment service system in accordance with the present invention includes a musical performance/accompaniment main server 10, musical performance/accompaniment local servers 20 and user computers 11. The musical performance/accompaniment main server 10 provides a chorus/concert function for plural users using musical performance/accompaniment service program, the VOS (Virtual Orchestra System) file representing notes for each musical instrument in the timing of playing operation by partitioning notes based on the playing order and the musical instruments, a noraebang music file representing the lyric texts, the singing order, and the accompaniment sound by inserting sync between the lyric texts and the beat to the VOS (Virtual Orchestra System) file. The musical performance/accompaniment local server 20 downloads the VOS musical file, the accompaniment (noraebang) file, and musical performance/accompaniment service program from musical performance/accompaniment main server 10 connected through a communication network, such as an Internet, and executing the solo function, the chorus/concert function, or the chorus/concert function for the distributed users by connecting to another local servers through a communication network, such as an Internet. The user computer 11 is connected with the musical performance/accompaniment local server 20 through a communication network, such as an Internet, for downloading, installing, and storing the VOS musical file, accompaniment (noraebang) file, and musical performance/accompaniment service program, and executing the chorus/concert function or the vocal solo/solo function for users on its own or another musical performance/accompaniment local server.

Plural users on one or more musical performance/accompaniment local server are connected through Internet play in concert/chorus by selecting a music for a concert/chorus.

For example, when the communication networks in FIG. 1 or FIG. 2 is Internet, the present invention provides the VOS file using the TCP/IP (Transmission Control Protocol/Internet Protocol), which is a kind of network protocol for data exchange between different types of computer systems, or IPX (Internet Packet exchange) protocol (or referred as IPX/SPX (Sequence Packet exchange)) for the data exchange in LAN, and, therefore, the users on remote area or local area play in concert or concert/chorus by selecting a music through chatting.

Figure 3:
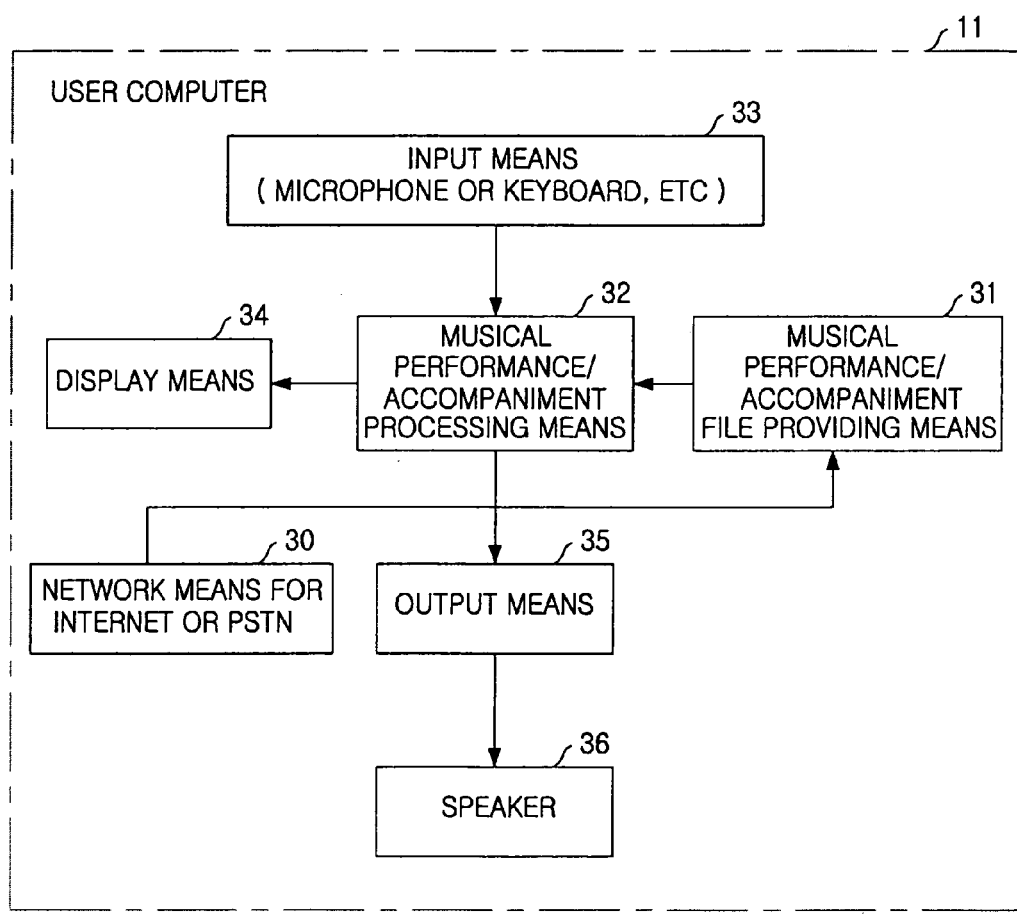
FIG. 3 is a diagram illustrating an embodiment of user computer system of FIG. 1 and FIG. 2.

FIG. 3 is a diagram illustrating the structure of a user computer system of the embodiments of FIGS. 1 and 2.

As illustrated in FIG. 3, the user computer 11 for a musical performance/accompaniment service includes Internet or PSTN access means, musical file providing means 31, displaying means 34, input means 33, musical performance/accompaniment processing means 32, output means and a speaker 36.

The Internet or PSTN access means 30 connect the user computer to the musical performance/accompaniment main server 10 or musical performance/accompaniment local server 20 through Internet or sending/receiving the information, such as the VOS musical file, the accompaniment (noraebang) file, the musical performance/accompaniment service programs. The musical file providing means 31 provide the VOS (Virtual Orchestra System) file received by the Internet or PSTN access means 30, represent notes for each musical instrument in the timing of playing operation by partitioning notes based on the playing order and the musical instruments, a noraebang music file, which are received by the Internet or PSTN access means 30, represent the lyric texts, the singing order, and the accompaniment sound by inserting sync between the lyric texts and the beat to the VOS (Virtual Orchestra System) file. The displaying means 34 display the lyric texts and the singing order in the accompaniment file, or the notes of the VOS file as an electronic score showing the playing order. The input means 33(for example, a microphone or a keyboard) get the voice inputs of singers according to the singing order on displaying means 34 or the playing operation inputs of users according to the playing order of the notes on an electronic score. The musical performance/accompaniment processing means 32 store accompaniment files and the VOS files, provide the lyric texts and the singing order in the accompaniment files to the displaying means 34, convert the notes of the VOS file into an electronic score showing the playing order, provide it to the displaying means 34, output the voice input from the input means 33 (a microphone) and the accompaniment sound excluding the users voice, or outputting the designated sound from the input means 11 (a keyboard, etc.) and the background sound excluding the designated sound. The output means 35 synthesize the users voice and the accompaniment sound, or the designated sound and the background sound from the musical performance/accompaniment processing means, and play it back. The speaker 36 output the sound from the output means 35.

The input means 33 are devices for getting inputs from users, for which a keyboard, a mouse, MIDI instrument, joypad and simulative musical instrument are available and they may get the playing operation input of the users according to the playing order of notes in the electronic musical score on the displaying means 34.

The displaying means 34 might be a monitor, LCD panel, screen, or TV, which shows the lyric texts and the singing order in the accompaniment files or the VOS files as a type of an electronic score.

The musical performance/accompaniment processing means 32 download and store the accompaniment files and the VOS files from the musical performance/accompaniment file providing means 31 using the set-top box, game devices, noraebang equipments, provide the lyric texts and the singing order in the accompaniment files to the displaying means 34, convert the notes of the VOS file to an electronic score showing the playing order and provide it to the displaying means 34, process the user input, and output the voice input from the input means (a microphone) 33 and the accompaniment sound excluding the users voice, or the designated sound from the input means (a keyboard, etc.) 11 and the background sound excluding the designated sound.

The musical file providing means 31 provide the accompaniment (noraebang) files, and the VOS file, which are required for musical performance/accompaniment services, using network lines, hard discs, CD-ROMs. The VOS file is a musical file representing notes for each musical instrument in the timing of playing operation by partitioning notes based on the playing order and the musical instruments, and the method of partitioning notes will be explained in the later part of this description.

The VOS file can be read from the user's terminal or downloaded from external source through communication networks, such as another host on networks, satellite, or set-top box. The accompaniment (noraebang) files represents the lyric texts, the singing order and the accompaniment sound by inserting the sync between the lyric texts and the beat to the VOS file.

The output means 35 synthesize the users' voice and the accompaniment sound from the musical performance/accompaniment processing means 32, or MIDI output message (the designated sound and the background sound), and play back the music using a MIDI module, a software MIDI, a FM synthesizer, etc.

Figure 4:
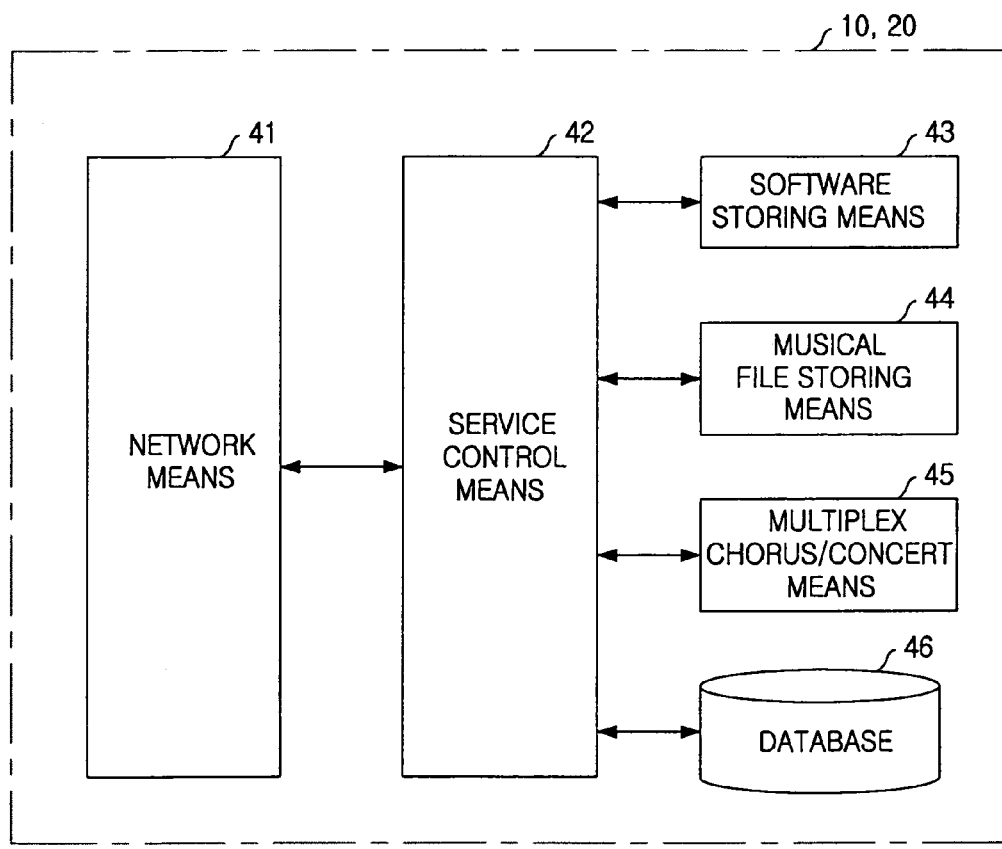
FIG. 4 is a schematic diagram illustrating an embodiment of a musical performance/accompaniment server.

FIG. 4 is a schematic diagram illustrating an embodiment of a musical performance/accompaniment server.

As illustrated in FIG. 4, the musical performance/accompaniment servers 10 and 20 for a musical performance/accompaniment service in accordance with the present invention include network means, service control means 42, software storing means 43, musical file storing means 44, multiplex chorus/concert means 45 and database means 46

The network means 41 is connected to user computers 11 through the communication networks, such as Internet and PSTN, for receiving the singing (vocal solo/chorus) data or the playing (solo/concert) data from user computers 11, and transmitting the VOS (Virtual Orchestra System) file representing notes for each musical instrument in the timing of playing operation by partitioning notes based on the playing order and the musical instruments, a noraebang music file representing the lyric texts, the singing order, and the accompaniment sound by inserting sync between the lyric texts and the beat to the VOS (Virtual Orchestra System) file, the musical performance/accompaniment service programs, and the singing/playing data of other users. The service control means 42 receive the singing/playing data of the users, the accompaniment (noraebang) file, the VOS file or the musical performance/accompaniment service programs and controlling the service. The software storing means 43 store the musical performance/accompaniment service program, and provide the musical performance/accompaniment service programs in response to the request of the service control means 42. The musical file storing means 44 classify and store the accompaniment (noraebang) file and the VOS file based on genre, and provide the musical file requested by the user to the service control means 42 and user computer 11 through the network means 41. The multiplex chorus/concert means 45 selects a music and the musical instrument to be played in chorus/concert for plural users through a communication networks, such as an Internet, provide an environment for playing in chorus/concert, and transmit the singing/playing data of each user to all the users. The database means 46 store information on the user subscribing the musical performance/accompaniment servers 10 and 20, the musical file stored in the musical file storing means 44 and evaluation data (point numbers for songs, or evaluation grade for each musical instrument and the concert, such as "Excellent", "Very Good", "Good" . . . )

As described above, for the musical performance file, the VOS file is used and the accompaniment (noraebang) file represents the lyric texts, the singing order, and the accompaniment sound by inserting sync between the lyric texts and the beat to the VOS file. The background sound excluding the playing sound by users playing operation can be blank out for the clear recognition of the playing state.

The generating process of the VOS file in the musical performance/accompaniment servers 10 and 20 will be explained concretely in the following.

Figure 5:
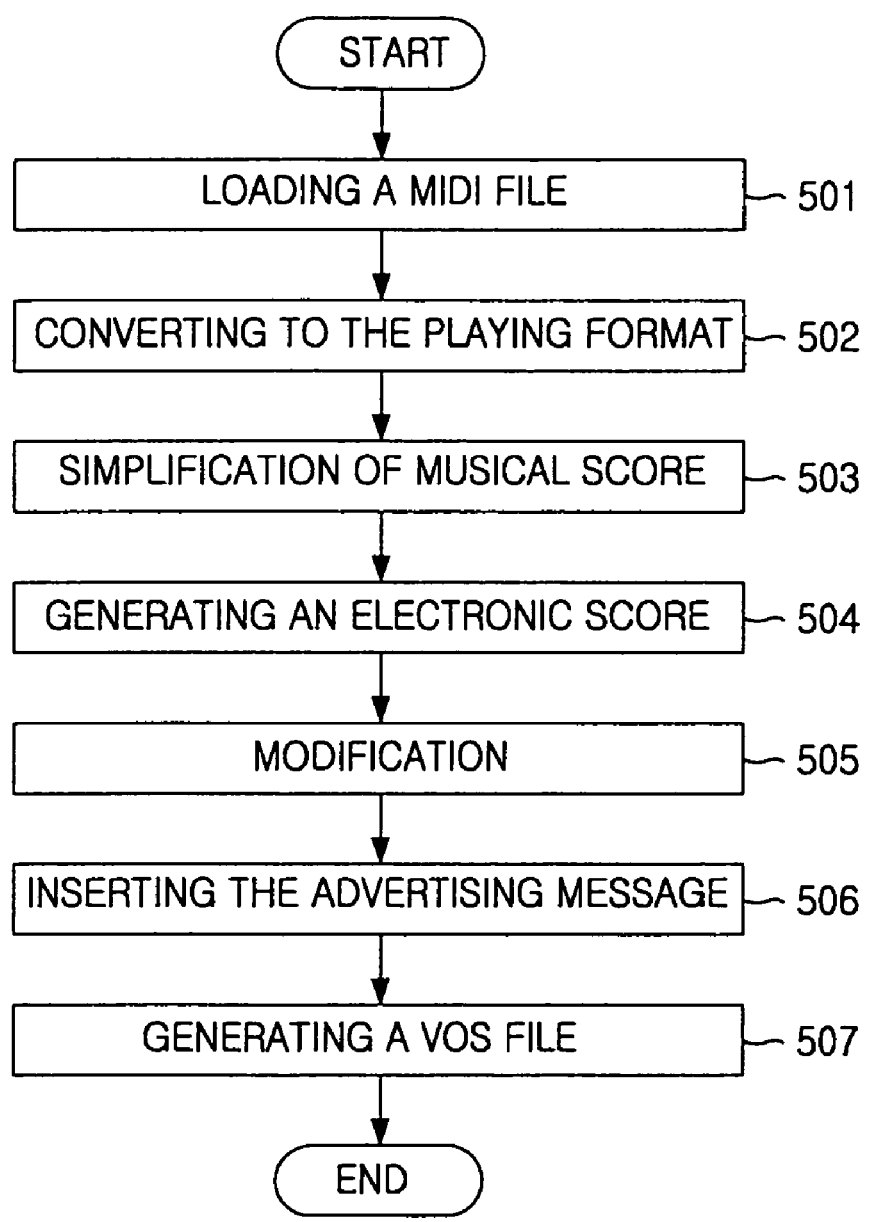
FIG. 5 is a flowchart illustrating an embodiment a method of generating the VOS file for a musical performance/accompaniment service in accordance with the present invention.
Figure 6:
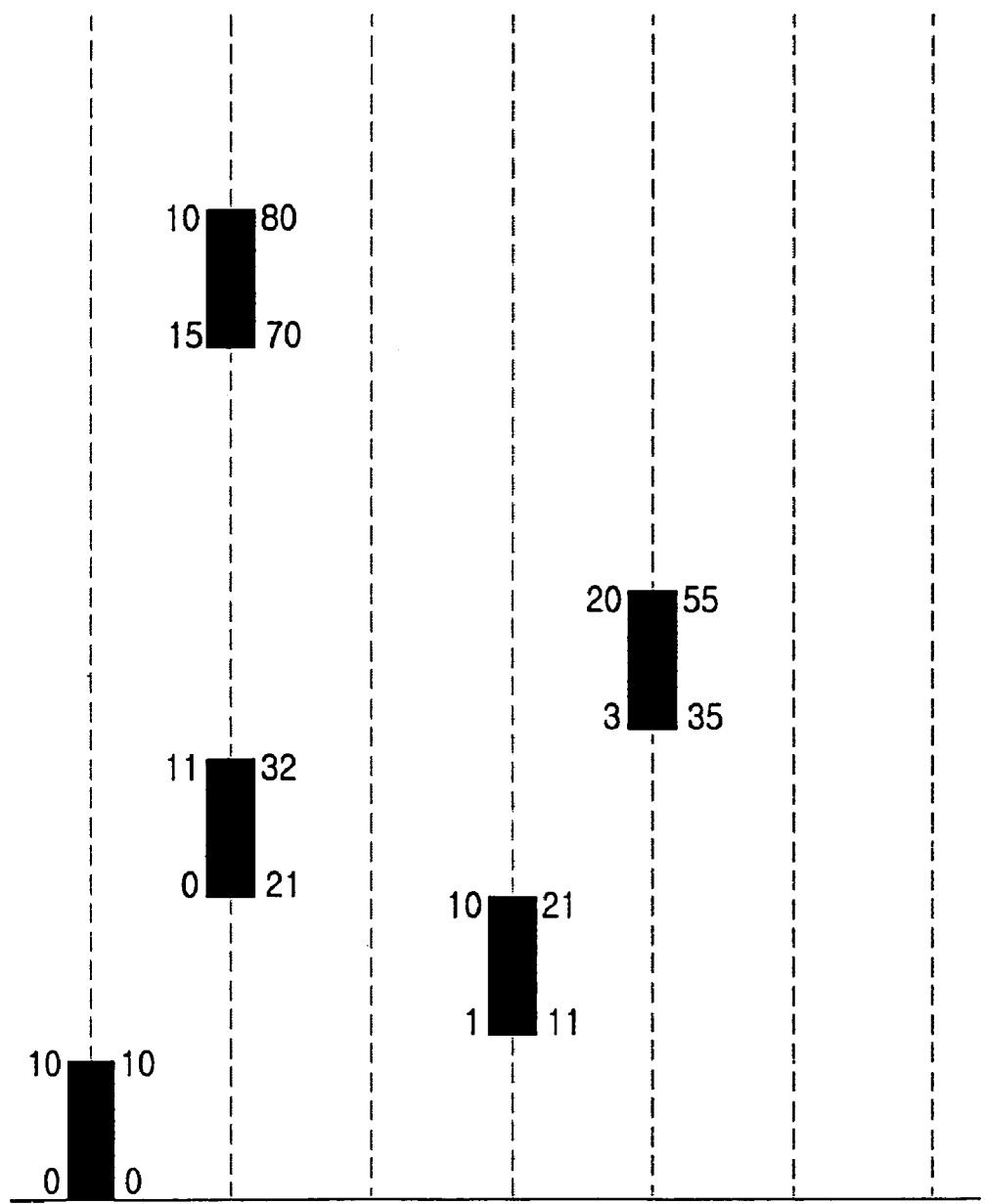
FIG. 6 is a schematic view illustrating an embodiment of the generating method of an electronic score in the process of partitioning the notes for each musical instrument and storing them in accordance with the present invention.
Figure 7:
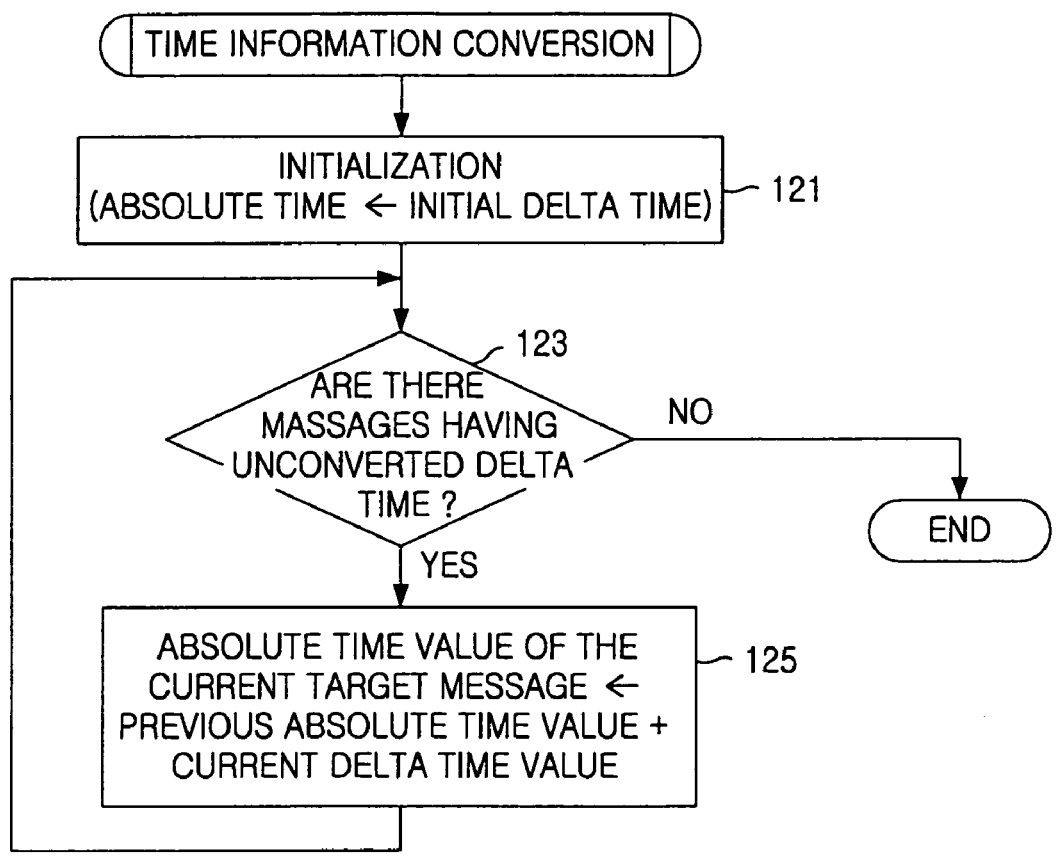
FIG. 7 is a schematic view illustrating an embodiment of the complexity adjustment method in the process of partitioning the notes for each musical instrument and storing them in accordance with the present invention.

FIG. 5 is a flowchart illustrating an embodiment a method of generating the VOS file for a musical performance/accompaniment service in accordance with the present invention, and represents the partitioning and storing procedure of notes. FIG. 6 is a diagram for explaining the concept of the delta time and the absolute time, and FIG. 7 is a flowchart illustrating the conversion procedure of the delta time information of a MIDI file to the absolute time information in accordance with the present invention.

As illustrated in FIG. 5, to obtain necessary information from messages in a MIDI format music file, the formation of the VOS file in the musical performance/accompaniment servers 10 and 20 classifies MIDI messages on the basis of type and stores them in a memory at step 501. For the reference, the messages are divided into control messages (such as volume control, effect, etc), playing messages, and musical instrument configuration messages, etc. and a time domain of the entire message in the MIDI file is defined as a delta time. In the delta time system, all the time information of message are decided based on a time gap between the prior time information and the current time information (see FIG. 6.

During the formation of the VOS file in the present invention, the MIDI format message defined as the delta time have to be converted to those of the absolute time for a Virtual Orchestra playing at step 502.

The meaning of the delta time and absolute time is easily understood by FIG. 6 illustrating the display of the time information for playing a message. That is, in FIG. 6, the left part shows the delta time information and the right part the absolute time information.

Also, the conversion of the delta time to the absolute time can be explained by the flowchart of FIG. 7. That is, the conversion of the delta time information of the MIDI format message to the absolute time information is accomplished by an initialization of setting the first value of the delta time as the initial value of the absolute time at step 121, and it repeatedly performs the steps of deciding if there is any unconverted delta time information at step 123 and setting the absolute time value of the current target message by adding the current delta time value of target message to the previous absolute time value at step 125 until there is no more messages having unconverted delta time information.

Then, in a construction of the note messages for users to play, the present invention forms a VOS file so that a user may select just one musical instrument through all the playing time, change the instrument during the playing time, or plural users may play with each their own musical instrument simultaneously.

In some cases, the playing operation input devices to play all the range of notes without any modification such as simplification may be required, but in most case unskilled people don't require to play the sophisticated music in such a way. The simplification of the playing operation is necessary so that unskilled people play musical instruments without excessive training, and, on the contrary, the advanced playing operation is required for the specialized players through the complication of the playing operation at step 503.

For example, the simplification process of a musical score will be explained in the following referring to FIG. 8 and FIG. 9.

Figure 8:
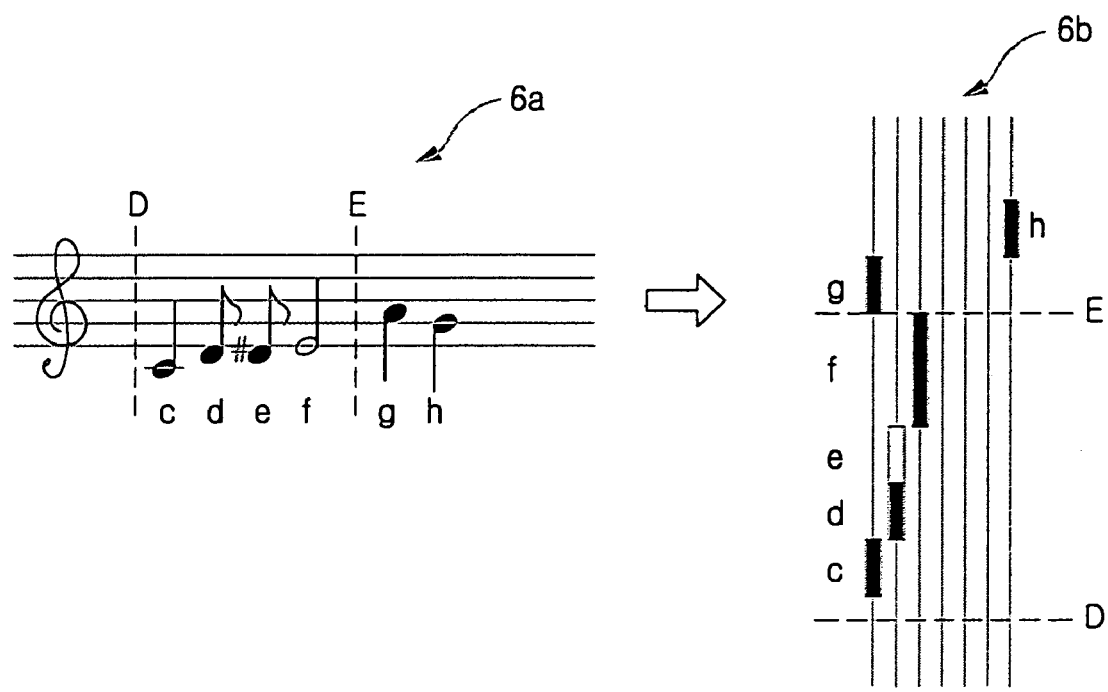
FIGS. 8 and 9 are schematic views illustrating a simplification process of a musical score in accordance with the present invention.
Figure 9:
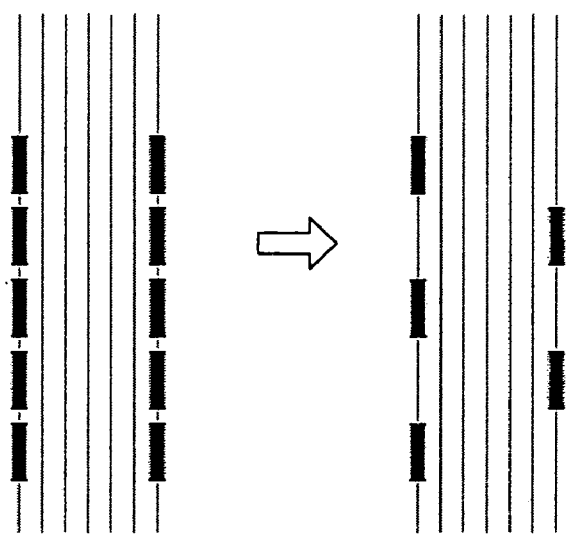

Referring to FIG. 8, all the range of notes can be confined within just one octave by removing the octave element in notes ("g" of 6a and 6b). Among the notes, semitones can be replaced with whole-tones ("e" of 6a and 6b). Through these processes, the original musical score 6a can be simplified to a new type of electronic musical score 11b at step 504. However, such a new electronic musical score 11b actually has both the original information for users to direct the normal playing operation and simplified information of the playing operation.

Figure 12:
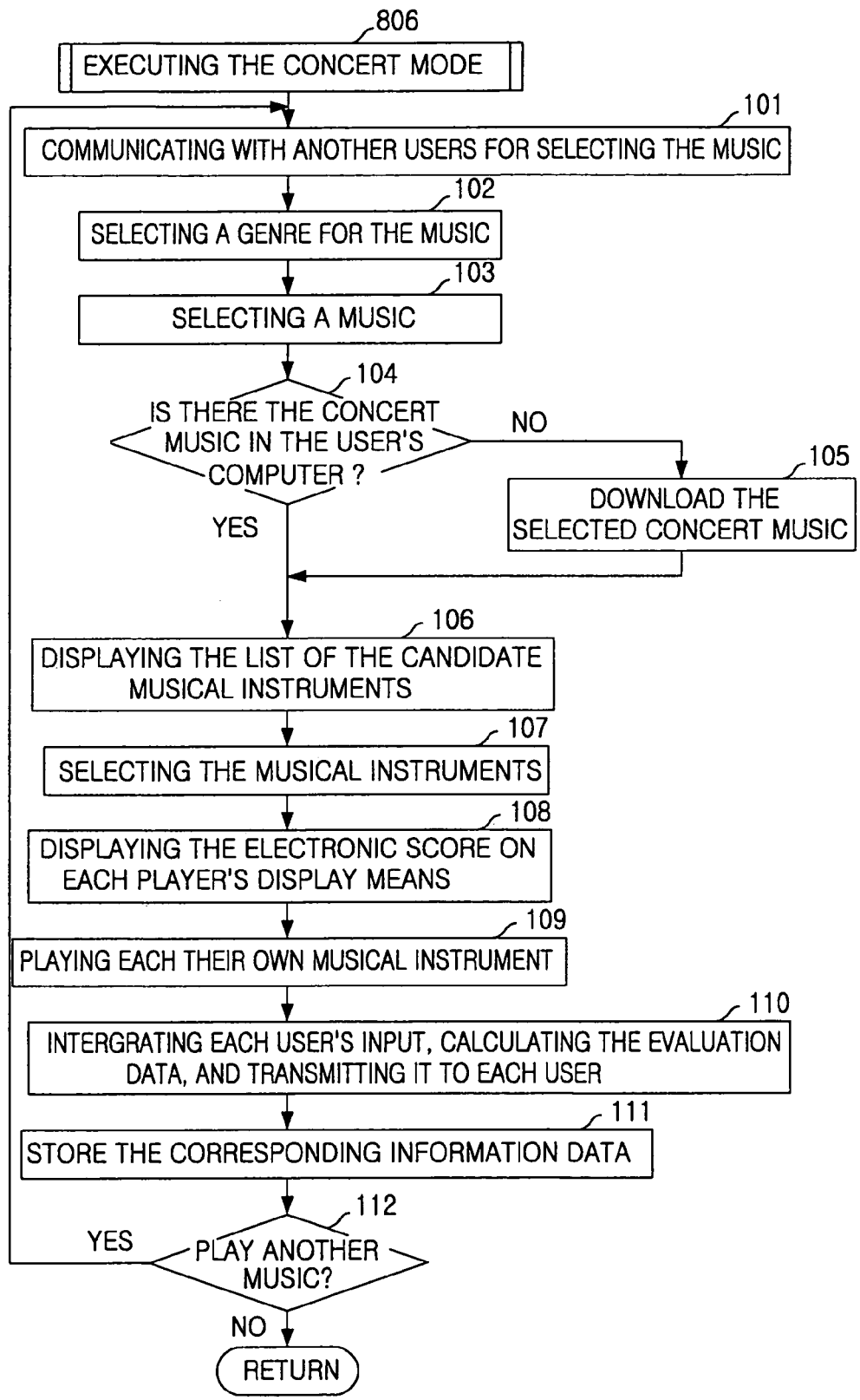
FIG. 12 is a flowchart illustrating an embodiment of a concert executing method in the musical performance/accompaniment service method in accordance with the present invention.

Also, if necessary, additional modification, such as a change of the arrangement of the note and deletion of the notes to be played, can be made for the new style electronic score generated at step 505. For example, an editor can be used for adjusting the complexity by deleting the notes, as illustrated in FIG. 12.

On the other hand, when the original score has idle time, or is modified by changing the arrangement or deleting the notes, additional advertising information (advertising words, images, sound clips for some corporation, goods, music) can be inserted for such idle time. In this case, specifying the display time of the advertising information enlarges the utility of the VOS file at step 506.

Finally, the VOS file is generated at step 507.

Figure 10:
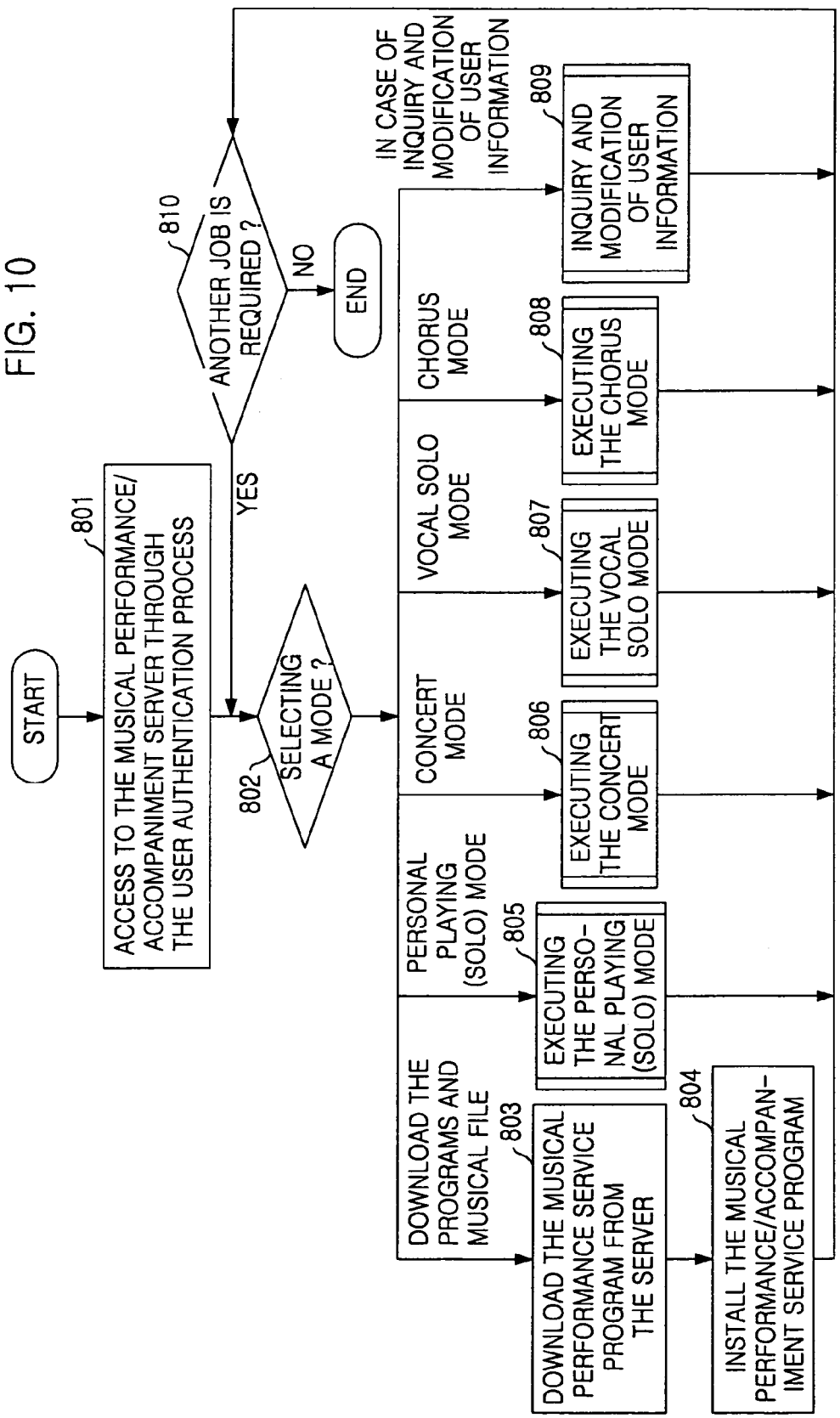
FIG. 10 is an overall flowchart illustrating an embodiment of a musical performance/accompaniment service method in accordance with the present invention.

FIG. 10 is an overall flowchart illustrating an embodiment of the musical performance/accompaniment service method in accordance with the present invention.

As illustrated in FIG. 10, in the musical performance/accompaniment service method in accordance with the present invention, the users access the musical performance/accompaniment main server 10 through the user authentication process at step 801, and select a function at step 802.

According to the selection of a function, when downloading the musical performance/accompaniment service program, the VOS (Virtual Orchestra System) file representing notes for each musical instrument in the timing of playing operation by partitioning notes based on the playing order and the musical instruments, and a noraebang music file representing the lyric texts, the singing order, and the accompaniment sound by inserting sync between the lyric texts and the beat to the VOS (Virtual Orchestra System) file, the musical performance/accompaniment service program, the accompaniment (noraebang) file, and the VOS file are downloaded from the software storing means 43 and the musical file storing means 44 of the musical performance main server 10 at step 803.

The musical performance/accompaniment service program is installed at the user computer 11 at step 804, the necessity of another playing is decided at step 810, and the process returns to the selection step of a function at step 802, if needed, while goes to the exit step, if not needed.

When the result of selecting a function is the solo (personal playing) function, it is executed at the musical performance/accompaniment main server 10 or the user computer 11 at step 805, and the process go to the deciding step of necessity of another execution at step 810.

When the result of selecting a function is the concert (team playing) function, it is executed connecting with the musical performance/accompaniment main server 10 at step 806, and the process goes to the deciding step of necessity of another playing at step 810.

When the result of selecting a function is the vocal solo function, it is executed at the musical performance/accompaniment main server 10 at step 807 or the user computer 11, and the process goes to the deciding step of necessity of another playing at step 810.

When the result of selecting a mode is the chorus function, it is executed at step 808, being connected with the musical performance/accompaniment main server 10 at step 806, and the process goes to the deciding step of necessity of another playing at step 810.

When the result of selecting a function is the inquiry and the modification of user information, the user information stored in the musical performance/accompaniment main server 10 is loaded and altered at step 809, and the process goes to the deciding step of necessity of another execution at step 810.

Figure 11:
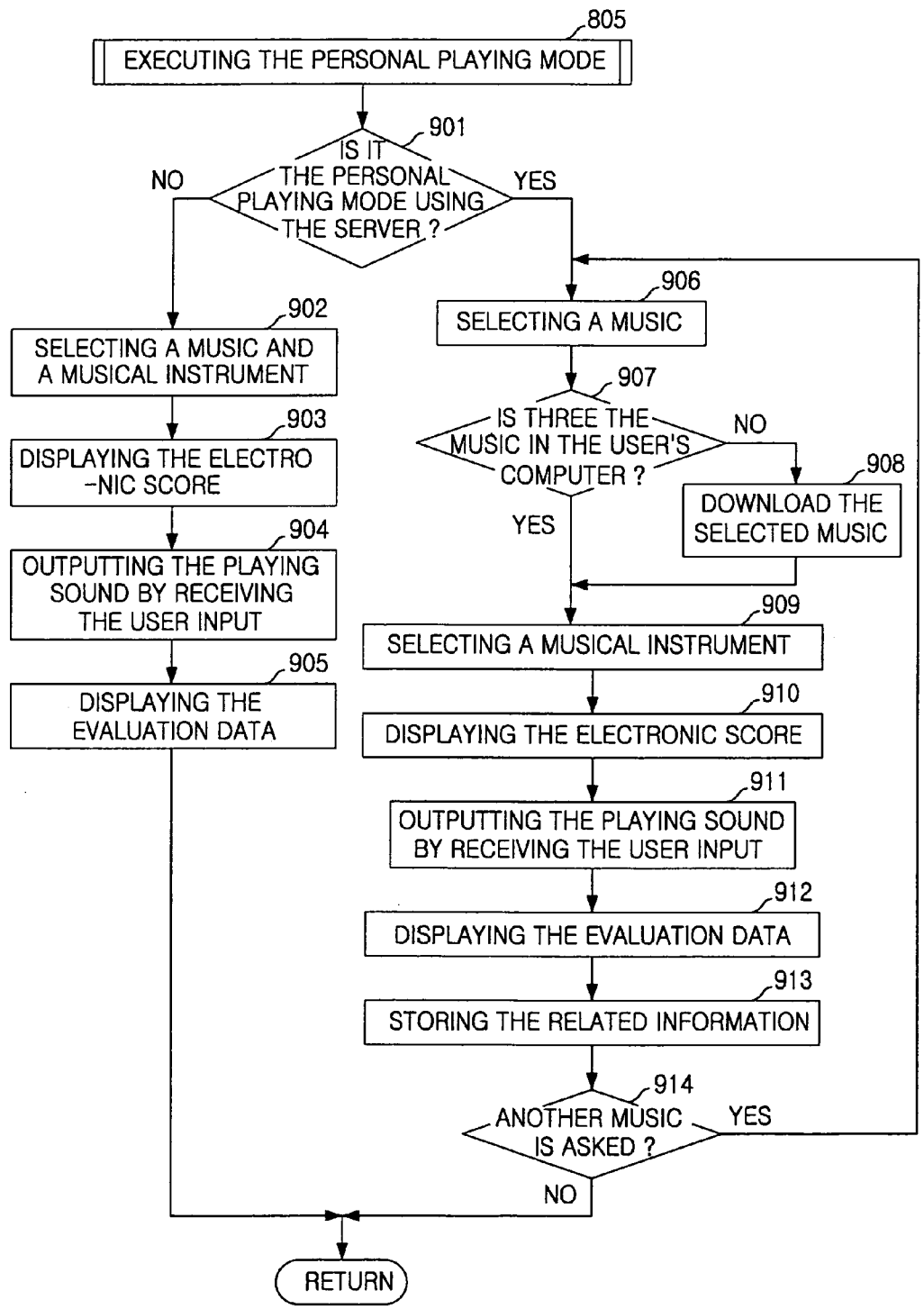
FIG. 11 is a flowchart illustrating an embodiment of a solo executing method in the musical performance/accompaniment service method in accordance with the present invention.

FIG. 11 is a flowchart illustrating an embodiment of a personal playing in the musical performance/accompaniment service method in accordance with the present invention;

As illustrated in FIG. 11, in the personal playing (solo) at step 805 in the musical performance/accompaniment service method in accordance with the present invention, the user decides if the personal playing executed through the musical performance/accompaniment main server 10 at step 901.

Figure 16:
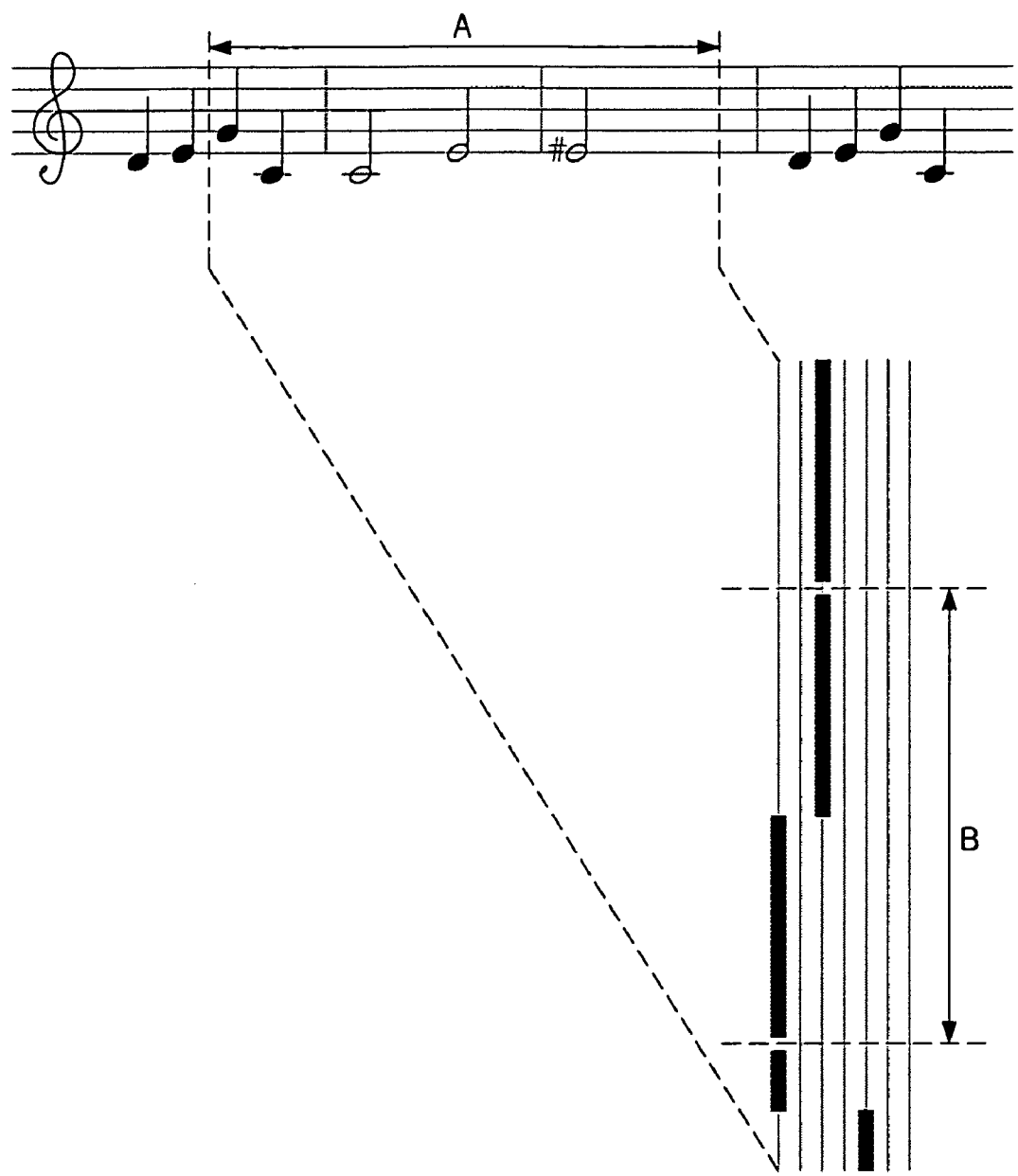
FIG. 16 is a schematic view illustrating an embodiment of an electronic score displaying method in the musical performance service method in accordance with the present invention.

When the result of selecting a function is not the personal playing (solo) function, the music and the musical instruments to be played are selected at the user computer 11 at step 902, and the user computer 11 displays the electronic score through the displaying means 34 at step 903. In most case, the length of an electronic score is too long to be displayed on screen at a time, so the electronic score should be scrolled to the part to be played according to the playing timing. This displaying process is as illustrated in FIG. 16. That is the notes of part A are transformed to part B.

When the user plays according to the electronic score on the display means 34, the musical performance/accompaniment processing means 32 of the user computer 11 receive the playing operation input of the user, synthesize the playing operation input with the background sound, and output it at step 904.

After playing of the user, the musical performance/accompaniment processing means 32 display the evaluation data for the musical instruments for the selected music.

When the result of selecting a function is the personal playing (solo) function, the user selects a music in the VOS file stored in the musical performance/accompaniment main server 10. If the selected music exists, the user selects a musical instrument at step 909. If not, the user first downloads the VOS file for the selected music at step 908, and selects a musical instrument at step 909.

After that, the user computer 11 displays the electronic score on the display means 34 at step 910. The displaying procedure is the same as the displaying of step 903. The user plays according to the electronic score on the display means 34, the musical performance/accompaniment processing means 32 of the user computer 11 receive the playing operation input from the input means 33, synthesizing it with the background sound, and output it at step 911.

After that, the musical performance/accompaniment processing means 32 output the evaluation data for the selected musical instrument on the display means 34 at step 912.

Finally, the information on the performance, such as the evaluation data for the musical file, etc., is stored in the database of the musical performance/accompaniment main server at step 913. The necessity of another execution is examined at step 914, and the process returns to the selecting step at step 906, if the user wants to, while goes to the exit step, if the user doesn't want.

The step of receiving the playing operation input of the user, and outputting it at steps 904 and 911 is explained more concretely in the following. When the user plays with the input means 33 according to the display means 34, the musical performance/accompaniment processing means 32 recognize the user input. After that, the musical performance/accompaniment processing means output the notes corresponding to the user input keys (MIDI output messages for the designated sound) and the other notes for the unselected musical instruments (MIDI output messages for the background sound) to the output means 35 at a real time. For the normal (not simplified) electronic score, such as for playing of a MIDI instrument, the input goes out without any simplification process, while, for the simplified electronic score, the note nearest to the real input, instead of the original input, goes out through a simplification process.

Figure 17:
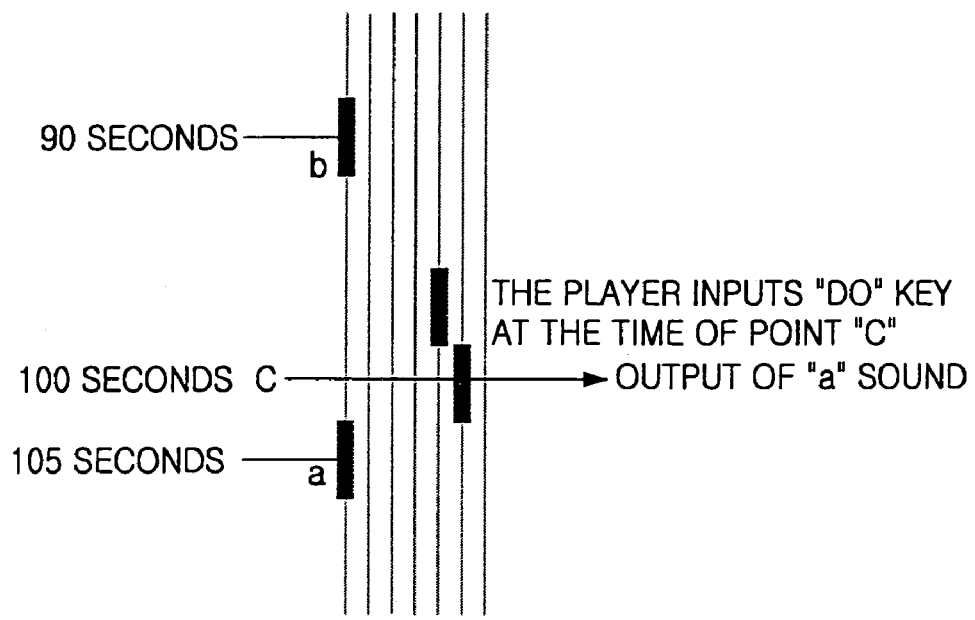
FIG. 17 is a schematic view illustrating an embodiment of a designated sound outputting method in the musical performance service method in accordance with the present invention.

For example, as illustrated in FIG. 17, if the user put downs 'Do' after a lapse of 100s (C) from the starting point, and if 'Do' of the 5th (b) octave exists at a position after a lapse 90s, and that of 6th octave (a) is at the 105s, the notes nearer to the user input (a), that is, the note after a lapse of 105s may be decided to be played.

Figure 18:
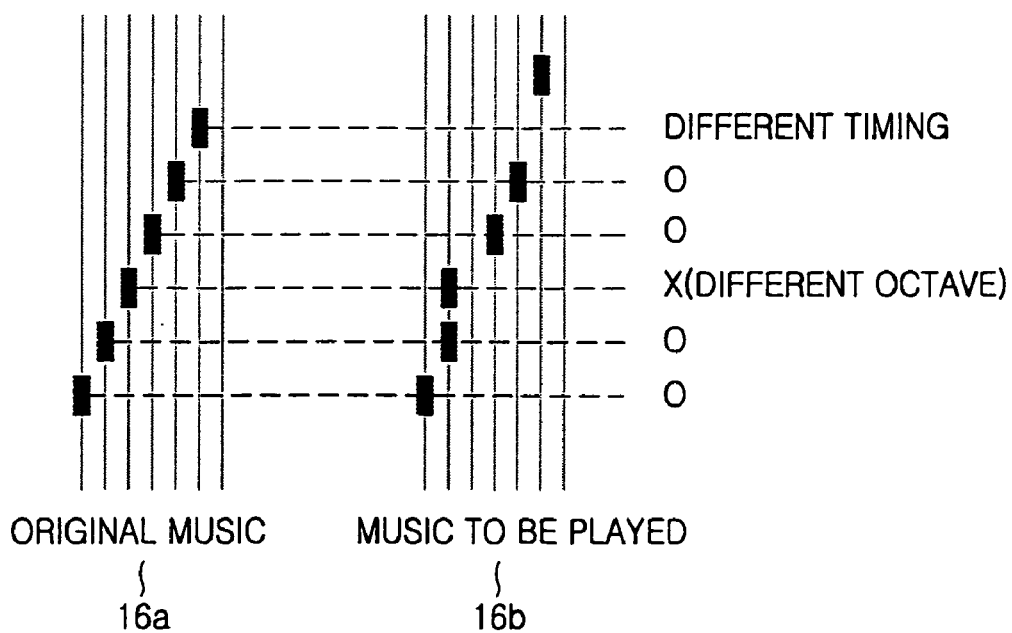
FIG. 18 is a schematic view illustrating an embodiment of an evaluation data displaying method in the musical performance service method in accordance with the present invention.

Then, the sound corresponding to the notes played by the user with a musical instrument and the background sound corresponding to the notes played by the musical performance/accompaniment processing means 35 automatically, not by the user, are mixed at a real-time by the output means 32, and go out through the speaker 36. During this processing, the evaluation of the playing 16b, compared with the original music 16a, can be shown as illustrated in FIG. 18.

FIG. 12 is a flowchart illustrating an embodiment of the concert function in the musical performance/accompaniment service method in accordance with the present invention.

As illustrated in FIG. 12, in the concert function at step 806 in accordance with the present invention, the users logged on the musical performance/accompaniment main server 10 communicate one another for selecting a music to be played in concert at step 101, select a genre for the selected music at step 102, and finally decide the music for a chorus at step 103.

When the music for a chorus is selected at step 103, the musical performance/accompaniment processing means 32 of each user computer 11 determine if the selected music is in the user computer 11 at step 104, and the user, who doesn't have the selected music in his computer 11, downloads the selected music for a chorus first at step 105. If the user has the selected music in his computer 11, the service control means 42 of the musical performance/accompaniment main server 10 displays the list of the candidate musical instruments for the selected music on the user computer 11 at step 106.

Then, each player of the concert selects a musical instrument from the list of the candidate musical instruments 107, and the information on the result of the selection of the users are send to each user.

When the electronic score of the selected music is displayed on each user's computer 11 at step 108, each user plays his musical instrument at step 109 The musical performance/accompaniment main server 10, which is connected to each user, transmits the playing operation input of each user to the rest of the users, and the result is displayed on the display means 34.

The musical performance/accompaniment main server 10 integrates the inputs of the users, calculates the evaluation data and transmits it to each user at step 110, stores the information on the concert playing at step 111, decides whether another music is asked to be played, and goes to exit step, if not, while returns to step 101, if so.

When two users play in concert, the designated sound of first and second user are mixed with the sound of other musical instruments, which are not played by the users, at a real time, and the orchestral (concert) playing is accomplished by making the mixed sound heard to each user using communication networks such as Internet. It is obvious that the concert playing for more than two users follows the same way.

Figure 13:
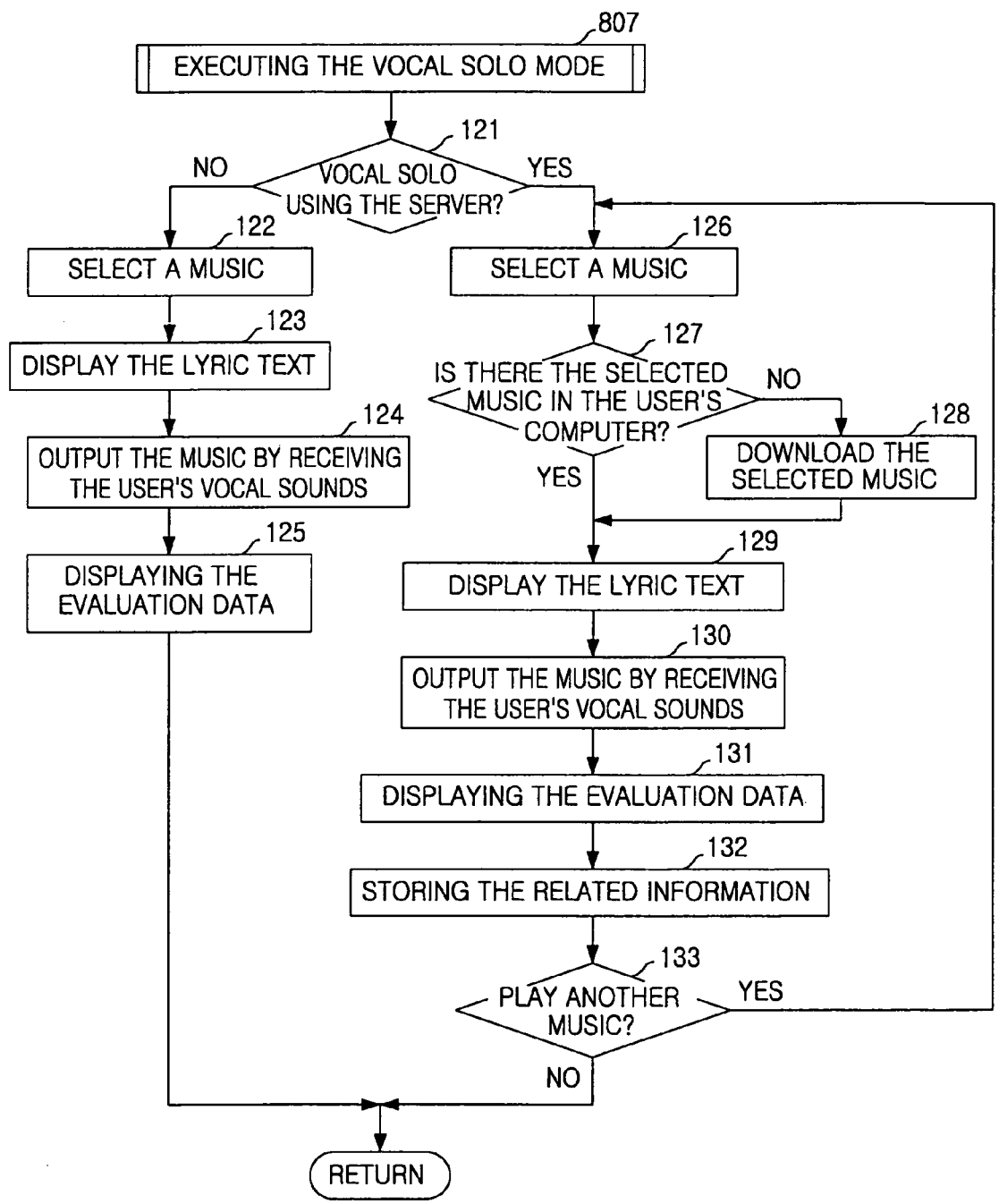
FIG. 13 is a flowchart illustrating an embodiment of a vocal solo executing method in the musical performance/accompaniment service method in accordance with the present invention.

FIG. 13 is a flowchart illustrating an embodiment of a vocal solo function in the musical performance/accompaniment service method in accordance with the present invention.

As illustrated in FIG. 13, in the vocal solo (personal playing) function at step 807 in the musical performance/accompaniment service method in accordance with the present invention, the user decides if the vocal solo (personal singing) is executed through the musical performance/accompaniment main server at step 121.

If the result is not the vocal solo through the musical performance/accompaniment main server 10, the user selects a song in the user computer 11, and the user computer displays the lyric texts through the display means 34. In this time, the singing order is displayed with the lyric texts (for example, by making the characters to be sung blink or displaying them as bold characters) and the accompaniment sound is outputted.

When the user sings according to the lyric texts on the display means 34, the musical performance/accompaniment processing device 32 of the user computer 11 gets the voice input of the user, synthesize the voice input with the background sound and output it at step 124.

When the song is finished, the musical performance/accompaniment processing means 32 display the evaluation data for the singer on the display means 34 at step 125.

If the result is the vocal solo through the musical performance/accompaniment main server 10, the user selects a song in the accompaniment files stored in the musical performance/accompaniment main server 10 at step 126, the musical performance/accompaniment processing means 32 of the user computer 11 determine if the selected music is in the user computer 11 at step 127. If the selected music is not in the user computer, the user downloads the selected music first at step 128, while the lyric texts is displayed on the user computer if it is at step 129. When the user sings according to the lyric texts on the display means 34, the musical performance/accompaniment processing means 32 of the user computer 11 get the user's voice input, synthesize the voice input with the background sound and output it at step 130.

When the song (vocal solo) is finished, the musical performance/accompaniment processing means 32 display the evaluation data for the singer on the display means 34 (for example, point numbers, or evaluation grade, such as "Excellent", "Very Good", "Good" "Poor" . . . ) at step 131.

Finally, the musical performance/accompaniment main server 10 stores the information on the song such as the evaluation data, in the database 46 of the musical performance/accompaniment main server 10 at step 132, decides whether another song is asked to be played at step 133, and goes to the exit step, if not, while returns to the selecting step (step 126), if so.

The accompaniment (noraebang file) file representing the lyric texts, the singing order for the singer, and the accompaniment sound can be implemented easily by the sync between the lyric texts and the beat to the VOS file.

Figure 14:
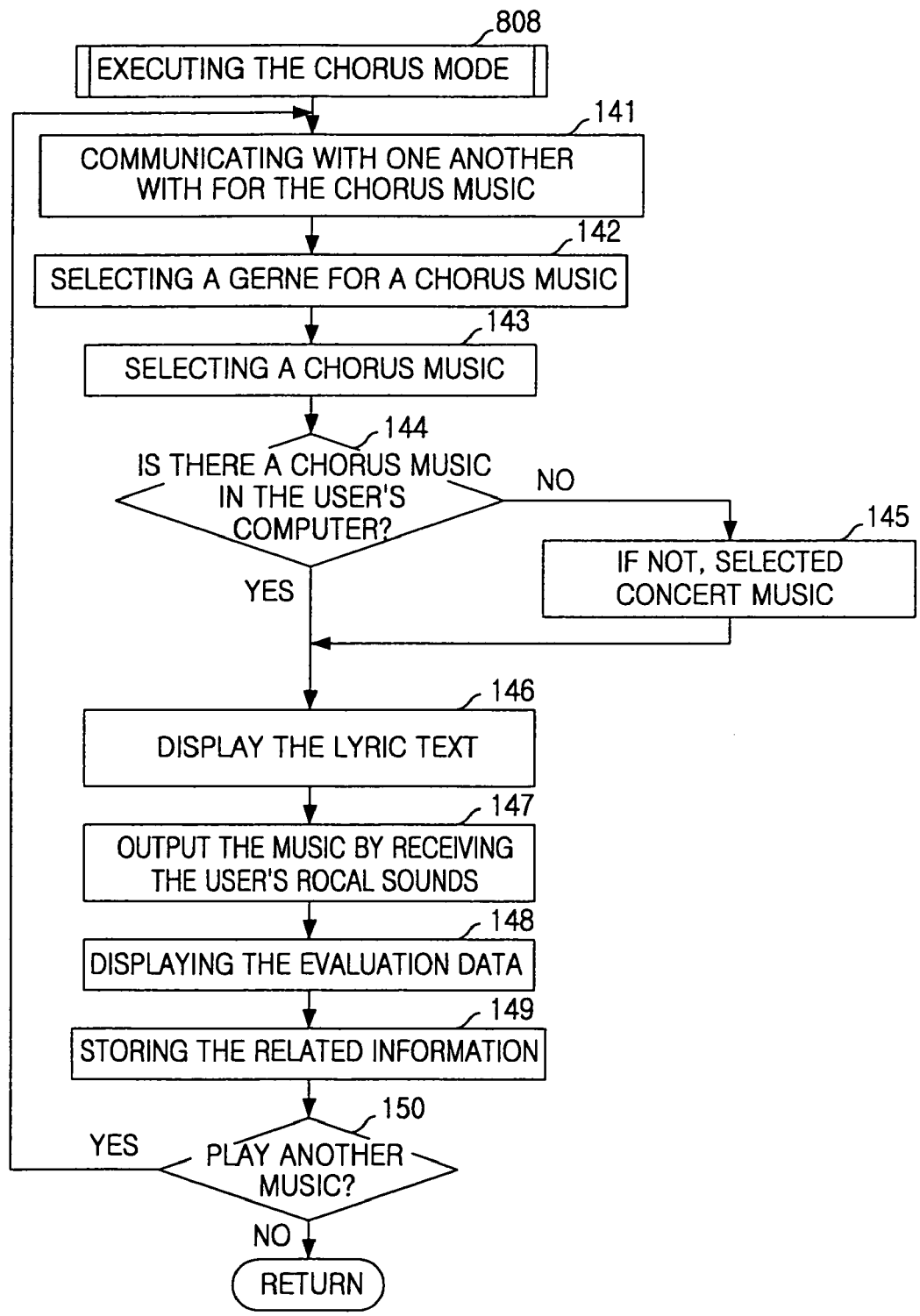
FIG. 14 is a flowchart illustrating an embodiment of a chorus executing method in the musical performance/accompaniment service method in accordance with the present invention.

FIG. 14 is a flowchart illustrating an embodiment of a chorus function in the musical performance/accompaniment service method in accordance with the present invention.

As illustrated in FIG. 14, in the chorus function at step 808 in accordance with the present invention, the users logged on the musical performance/accompaniment main server 10 communicate with one another for selecting a music to be played in chorus at step 141, select a genre for the selected song at step 142, and finally decide the song for a chorus at step 143.

When a song is selected at step 143, the musical performance/accompaniment processing means 32 of each user computer 11 determine if the selected song is in the user computer 11 at step 144, and the user, who doesn't have the selected song in his computer 11, downloads the song first at step 145. If the user has the selected song in his computer 11, the service control means 42 of the musical performance/accompaniment main server 10 displays the lyric texts on the display means of the user computer 11 at step 146.

When each singer play in chorus according to the lyric texts on the display means 34, the musical performance/accompaniment main server 10, which is connected to each user, transmits the voice of each singer to the rest of the users, and the result is displayed on the display means 34.

The musical performance/accompaniment main server 10 integrates the voice inputs of the users (that is, collects the voice inputs of the users and, synthesizing them with the accompaniment sound), and output it at step 147, calculates the evaluation data and transmits it to each user at step 148, stores the information on the chorus at step 149, decides whether another music is asked to be played at step 105, and goes to exit step if not, while returns to the communicating step (step 141), if so.

When two users play in chorus, the voice data of first and second singer are mixed with the accompaniment sound at a real time, and the orchestral (chorus) playing is accomplished by making the mixed sound heard to each user using communication networks such as Internet. It is obvious that the chorus playing for more than two users follows the same way.

Figure 15:
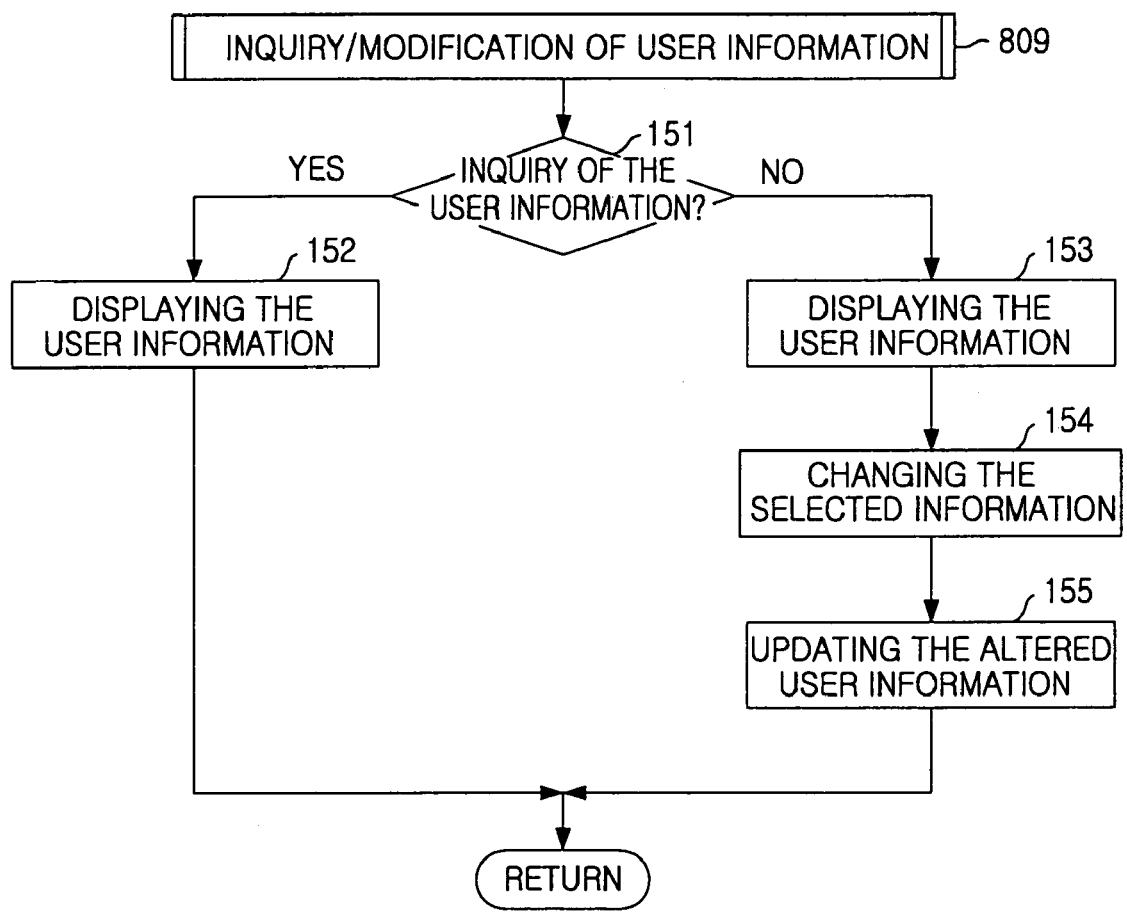
FIG. 15 is a flowchart illustrating an embodiment of the inquiry or the modification of user information executing method in the musical performance service method in accordance with the present invention.

FIG. 15 is a flowchart illustrating an embodiment of the inquiry or the modification of user information executing method in the musical performance service method in accordance with the present invention.

As illustrated in FIG. 15, in the inquiry or the modification of user information executing method at step 809 in the musical performance service method in accordance with the present invention, whether the inquiry of the user information is asked is decided at step 561, and the user information is transmitted to the user computer 11 and showed in the display means 34 at step 152, if it is.

If the modification, not the inquiry, of the user information is asked, the user information is transmitted to the user computer 11, and displayed at step 153. The musical performance/accompaniment main server 10 updates the altered user information in the database 46 at step 155, when the user changes the user information at step 154.

In the present invention, the VOS file, which partitioning the notes for each musical instrument, is generated from a MIDI file or other sources, and the accompaniment file is generated by inserting the sync between the lyric texts and the beat to the VOS file.

The users can play in concert or chorus with other users in a virtual environment based on the VOS file and the accompaniment (noraebang) file. It is realized by synthesizing the users' voices and the accompaniment sound or superposing the designated sound directed by the users and the sound effect of the background sound provided by the system.

Since the present invention directs the timing of playing operation visually to the users, not only the skilled player but also the ordinary people may play the music more easily, and, the present invention may also adjust the complexity of performance by adding or deleting the input keys, and generate the advanced sound effect such as the scratch effect. Also, in accordance with the present invention; the result is evaluated by comparing the playing operation directed to the users with the real operation input by the users, and is given to the users as feedback, therefore the present invention is useful not only for amusement but also for contest. The present invention may be implemented for a user mode or plural users not only in communication networks such as Internet, but also a noraebang (karaoke), a game room, an arcade and a digital satellite-broadcasting network.

Figure 19:
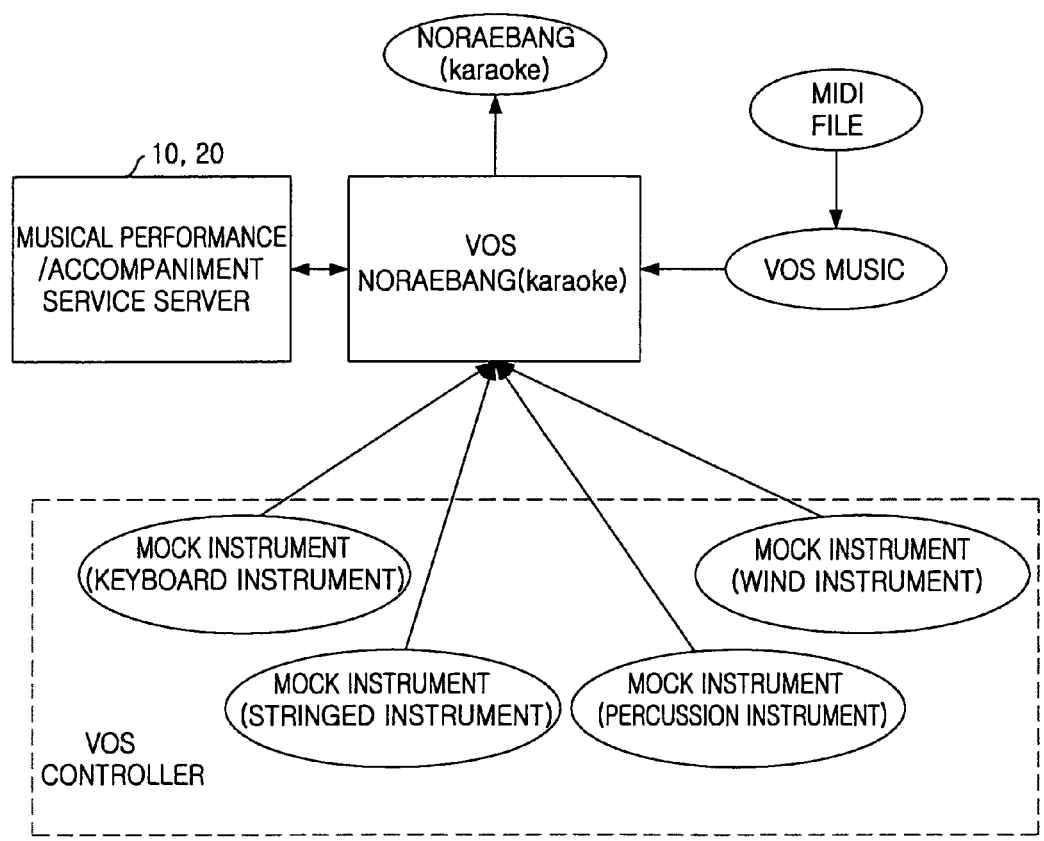
FIG. 19 is a diagram illustrating the structure of the VOS noraebang (Karaoke) performance environment in accordance with the embodiment of the present invention.

Referring to FIG. 19, in an application for noraebang (karaoke), the VOS installed karaoke system is used for a terminal, and the VOS controllers (preferably, simulative musical instruments such as keyboard instruments, stringed instruments, percussion instruments, wind instruments) for noraebang (karaoke) with ten or more buttons may be used for the input device. For output device, a well-known output system in karaoke may be used without a lot of change. The communication system may be achieved by the network system among the karaoke devices.

On the other hand, in game rooms, by installing the VOS system in each terminal, a user or plural users may play the music using each their own terminal.

In arcades, by inserting coins, the selected music may be played with hands or feet, and the game may be continued according to the grade of the game.

In the digital satellite-broadcasting system, the VOS player is installed on the set-top box. The information on the selected music is transmitted from the digital satellite, and the electronic score is displayed on a TV screen, therefore, the music may be played by the keypad of well-known remote controller according to the score.

The terminal device in the present invention is not confined to well-known computer system, and any kind of terminal devices with network means and web browser for executing the service programs in the present invention is available.

In this embodiment, one or more users play in on-line state connected to the service control means of the server, using the computer system through communication networks, or in off-line state executing the downloaded performance service program at a terminal device. The user/users play in vocal solo/chorus or solo/concert by selecting a musical instrument and playing to an electronic score displayed on the screen. Although the simplification of playing music is supposed so that one may play some musical instruments without much training, the wide range adjustment of complexity is realized by changing the key input (preferably, more than 20 input keys) so that extend the musical range to two or five octaves, and it is obvious that such a transformation has the same effect as the embodiment of the present invention and is within the technical aspect of the present invention. Also, the MIDI instrument may be used for an input device because the MIDI instrument doesn't make real sound but send out signals for sounds, and the correctness of the playing of the MIDI instrument may be compared with the real musical score. Further, feet as well as hands may be used for input and it is obvious that it is within the technical aspect of the present invention. Also, the simulative musical instruments used in a noraebang (karaoke), a game room, an arcade can be made in the shape of real musical instruments for amusement and it is obvious that it is within the technical aspect of the present invention.

The present invention does not confined to the embodiments or attached figures, and it is clear that the replacement, transformation or modification is possible for the skilled man in the art within the technical aspect of the present invention.

INDUSTRIAL APPLICABILITY

As apparent from above description, in the present invention, plural users, connected to the musical performance/accompaniment server through communication networks such as Internet or PSTN, can download the musical performance/accompaniment program, the accompaniment (noraebang) file, and the VOS file, play the selected song in chorus with other singers in a virtual environment, and even the users unskilled in real musical instruments are able to play the selected music more easily. Therefore, one or more distributed users can play in vocal solo/chorus or solo/concert with each own musical instrument without any expensive real musical instruments, studio, or other equipments.

What is claimed is:

1. A network based musical performance service system, comprising:
   musical performance service providing means for providing musical performance file, musical performance service programs, and musical playing functions for at least one user; and
   at least one musical performance executing means connected with said musical performance service providing means through communication networks for downloading said musical performance file and said musical performance service programs, and playing a music, wherein the musical performance file is a Virtual Orchestra System (VOS) file representing notes for each musical instrument in timing of playing operation by partitioning notes based on the playing orders and the musical instruments, and wherein the VOS file is generated by classifying MIDI messages by type to get the necessary information from musical message stored in MIDI files; and converting delta time information in the MIDI file to absolute time information.

2. The network based musical performance service system as set forth in claim 1, wherein said musical performance service providing means provide a solo or concert function for plural users.

3. The network based musical performance service system as set forth in claim 2, wherein said musical performance executing means connected with said musical performance service providing means through communication networks provide the solo or concert function, after downloading said musical performance file and said musical performance service programs.

4. The network based musical performance service system as set forth in claim 1, wherein said musical performance service providing means are connected with at least two local servers in order to provide said musical performance file and musical performance service programs for each local server, and provide the solo function for a user, the concert function for plural users at one of said local servers and the concert function f or the distributed users associating with local servers through the communication networks.

5. The network based musical performance service system as set forth in claim 1, wherein said musical performance service providing means include:

program storing means for storing said musical performance service programs and providing musical performance service programs to said service control means in response to service control means;

musical file storing means for classifying and storing said musical performance file based on genre, and providing the musical performance file requested by said musical performance executing means to said service control means;

first networking means connected with said at least one musical performance executing means for transmitting said musical performance file and said musical performance service programs to said at least one musical performance executing means, and, in the concert function, receiving personal playing data from said at least one musical performance executing means and transmitting total playing data for the concert function to said at least one musical performance executing means;

service control means for controlling musical performance service, transmitting the musical performance file and musical performance service programs requested by said at least one musical performance executing means to said first networking means, personal playing data to multiplex concert means, and said total playing data to said first networking means;

multiplex concert means for offering the environment where said at least one musical performance executing means play in the concert function by selecting a music and the musical instruments, and generating total playing data by integrating said personal playing data of plural users; and storing means for storing information on said at least one musical performance executing means and musical performance file stored in said file storing means, and evaluation data for each musical instrument and concert playing for the selected music.

6. The network based musical performance service system as set forth in claim 5, wherein said at least one musical performance executing means include:

second networking means, connected with said musical performance service providing means, for receiving said musical performance file and said musical performance service programs from said musical service providing means, and, in the concert function, transmitting said personal playing(solo) data to said musical performance service providing means and receiving total playing(concert) data from said musical performance service providing means;

musical file providing means for providing musical performance file received through said second networking means;

displaying means for displaying electronic musical notes for musical instruments to be played as an electronic musical score that shows the playing orders of the notes on a screen;

at least one input means for getting a playing operation input from users according to the playing orders of notes in the electronic musical score on said displaying means;

musical performance processing means for installing and executing said musical performance service programs received through said second networking means, storing said musical performance file, converting the notes of said musical performance file for musical instruments to be played to the electronic musical score representing the playing orders, and providing the notes to said displaying means, and generating designated sounds manipulated by said at least one input means and background sounds excluding the designated sounds;

musical playing means for synthesizing the designated sounds and the background sounds from said musical performance processing means and playing it back; and output means f or outputting the sounds played back by said musical playing means.

7. The network based musical performance service system as set forth in claim 6, wherein the musical performance processing means have musical data classified depending on the track of the musical instrument, display the electronic musical score on said displaying means, and, in a single user mode, offer the designated sounds inputted by the user according to the electronic musical score and the background sounds to said musical playing means in the type of MIDI output message.

8. The network based musical performance service system as set forth in claim 6, wherein the musical performance processing means have musical data classified depending on the track of the musical instrument, display the electronic musical score on said displaying means, and, in a multi-user mode, offer said total playing(concert) data to said musical playing means.

9. The network based musical performance service system as set forth in claim 6, wherein said at least one input means are at least one terminals transmitting the playing operation inputted by users according to the playing orders of notes in said electronic musical score displayed on said displaying means to the musical performance processing means.

10. The network based musical performance service system as set forth in claim 6, wherein said electronic musical score is a digital electronic musical score, visually directs the playing orders by scrolling to the part of the musical score to be played according to playing time, where the complexity of the key input for each musical instrument is coordinated.

11. The network based musical performance service system as set forth in claim 6, wherein said electronic musical score is a digital electronic musical score, visually directs the playing orders by scrolling to the part of the musical score to be played according to playing time, where the range of all the notes is confined to one octave by removing the octave element in notes to degrade the complexity of the key input for each musical instrument, and all the semi-tones are replaced by whole-tones.

12. The network based musical performance service system as set forth in claim 6, wherein said electronic musical score is a digital electronic musical score, visually directs the playing orders by scrolling to the part of the musical score to be played according to playing time, where the range of notes to be played can be extended to two to five octaves by increasing the number of input keys to upgrade the complexity of the key input for each musical instrument.

13. A musical performance server providing a musical performance service through communication networks, comprising:
   program storing means for storing musical performance service programs and providing the musical performance service programs;
   musical file storing means for classifying and storing a musical performance file based on genre, and providing the musical performance file requested by musical performance executing means;
   first networking means connected with at least one musical performance executing means for transmitting said musical performance file and said musical performance service programs to said musical performance executing means;
   service control means for controlling said musical file storing means and said program storing means, which respectively transmits said musical performance file and said musical performance service programs requested by said musical performance executing means via said first networking means; and
   storing means for storing information on said musical performance executing means and said musical performance file stored in said musical file storing means, and evaluation data for a performance result of the selected music.

14. The musical performance server as set forth in claim 13, further comprising multiplex concert means for offering an environment where said musical performance executing means play in a concert by selecting the music and a musical instrument corresponding to said musical performance executing means and for generating total playing data by integrating personal playing data of plural users.

15. The musical performance server as set forth in claim 14, wherein said musical performance file is a VOS (Virtual Orchestra System) file representing notes for each musical instrument, which is correspondent to said musical performance executing means in the timing of playing operation by partitioning notes based on playing orders and the musical instruments.

16. The musical performance server as set forth in claim 15, wherein said first networking means are connected with said at least one musical performance executing means through a communication network for transmitting said musical performance file and said musical performance service programs to said at least one musical performance executing means, and, in the concert, receiving personal playing data from said at least one musical performance executing means and transmitting total playing data in the concert to said at least one musical performance executing means.

17. The musical performance server as set forth in claim 15, wherein said service control means control said musical performance service, transmit said musical performance file and said musical performance service programs requested by said at least one musical performance executing means to said first networking means, transmit personal playing data to the multiplex concert means, and transmit said total playing data to said first networking means.

18. The musical performance server as set forth in claim 15, wherein said storing means store a score related to the performance result of said musical performance executing means.

19. The musical performance server as set forth in claim 15, wherein said musical performance file is a VOS (Virtual Orchestra System) file representing notes for each musical instrument in the timing of playing operation by partitioning notes based on the playing orders and the musical instruments, further comprising:
   means for classifying MIDI messages by type and storing them in memory to get necessary information from a musical message stored in MIDI files;
   means for converting delta time information in the MIDI file to absolute time information and classifying the users based to the musical instrument;
   means for generating an electronic score by simplifying a playing style; and
   means for generating the musical performance file, which represents the notes for each musical instrument in the timing of playing operation by partitioning notes based on the playing orders and the musical instrument, by changing the position of notes, omitting notes needed and coordinating complexity of playing in the generated score.

20. The musical performance server as set forth in claim 19, means for inserting additional information (advertising message, image, or sound clip for some corporations, goods, music) to the complexity coordinated musical score and deciding the time to show the additional information to users.

21. The musical performance server as set forth in claim 15, wherein said musical performance executing means include:
   second networking means, connected with said musical performance service providing means, for receiving said musical performance file and said musical performance service programs from said musical service providing means, and, in the concert, transmitting said personal playing data to said musical performance service providing means and receiving total playing data for the concert from said musical performance service providing means;
   musical file providing means for providing said musical performance file received through said second networking means;
   displaying means for displaying electronic musical notes for said musical instrument to be played as an electronic musical score that shows the playing orders of the notes on a screen;

at least one input means for getting a playing operation input from users according to the playing orders of notes in the electronic musical score on said displaying means;

musical performance processing means for installing and executing said musical performance service programs received through said second networking means, storing said musical performance file, converting the notes of said musical performance file for said musical instrument to be played to the electronic musical score representing the playing orders, and providing the notes to said displaying means, and generating designated sounds manipulated by said at least one input means and background sounds excluding the designated sounds;

musical playing means for synthesizing the designated sounds and the background sounds from said musical performance processing means; and output means for outputting the sounds played back by said musical playing means.

22. The musical performance server as set forth in claim 21, wherein the musical performance processing means have musical data classified by tracks, each which is correspondent to the musical instrument, display the electronic musical score on said displaying means and offer, in a single user mode, the designated sounds inputted by the user according to the electronic musical score and the background sounds to said musical playing means in a type of MIDI output message and, in a multi-user mode, said total playing data for the concert to said musical playing means.

23. The musical performance server as set forth in claim 21, wherein said electronic musical score is a digital electronic musical score, visually directs the playing orders by scrolling to the part of the musical score to be played according to a playing time, and wherein said electric musical sore has different key inputs for each musical instrument.

24. The musical performance server as set forth in claim 21, wherein said electronic musical score visually directs the playing orders by scrolling to the part of the musical score to be played according to a playing time, where, to degrade a complexity of key inputs for each musical instrument, a range of all the notes is confined to one octave by removing octave elements in the notes and all semi-tones are replaced by whole-tones, or, to upgrade the complexity of the key inputs, the range of all notes is extended to two to five octaves by increasing the number of the input keys.

25. A musical playing terminal providing musical performance service comprising:

first networking means, connected with said musical performance service providing means through communication networks, for receiving said musical performance file and said musical performance service programs from said musical service providing means;

musical file providing means for providing musical performance file received through said first networking means;

displaying means for displaying electronic musical notes for musical instruments to be played as an electronic musical score that shows playing orders of the notes on a screen;

at least one input means for getting a playing operation input from users according to the playing orders of the notes in the electronic musical score on said displaying means;

musical performance processing means for installing and executing said musical performance service programs received through said first networking means, storing said musical performance file, converting the notes of said musical performance file for musical instruments to be played into the electronic musical score representing the playing orders, and providing the notes to said displaying means, and generating designated sounds manipulated by said at least one input means and background sounds excluding the designated sounds;

musical playing means for synthesizing the designated sounds and the background sounds from said musical performance processing means and playing it back; and output means for outputting the sounds played back by said musical playing means.

26. The musical playing terminal as set forth in claim 25, wherein said first networking means, connected with said musical performance service providing means through said communication networks, receive said musical performance files and said musical performance service programs from said musical performance service providing means, and, in a concert function, transmit personal playing data to said musical performance service providing means and receive total playing data for a concert from said musical performance service providing means.

27. The musical playing terminal as set forth in claim 25, wherein said musical performance service providing means provide the concert function for plural users.

28. The musical playing terminal as set forth in claim 25, wherein said musical performance service providing means are connected with at least two local servers and, by providing said musical performance file and musical performance service programs for each local server, provide the solo for a user or the concert function for plural users at one of said local servers and the distributed users associating with local servers through the communication networks.

29. The musical playing terminal as set forth in claim 25, wherein said musical performance service providing means include:

program storing means for storing said musical performance service programs and, in response to said service control means, providing musical performance service programs to said service control means;

musical file storing means for classifying and storing said musical performance file based on genre, and providing the musical performance file requested by said musical performance executing means to said service control means;

second networking means connected with said musical playing terminal means for transmitting said musical performance file and said musical performance service programs to said musical playing terminal, and, in the concert function, receiving personal playing (solo) data and transmitting total playing(concert) data to said musical playing terminal;

service control means for controlling musical performance service, transmitting the musical performance file and musical performance service programs requested by said musical playing terminal to said second networking means, personal playing data to multiplex concert means, and said total playing data to said second networking means;

multiplex concert means for offering the environment where said musical playing terminal plays in concert by selecting the music and the musical instruments, and generating total playing data by integrating said personal playing data of plural users; and storing means for storing information on said at least one musical performance executing means and musical performance file stored in said file storing means, and evaluation data for each musical instrument and concert play for the selected music.

30. The musical playing terminal as set forth in claim 25 wherein said musical performance file is a VOS (Virtual Orchestra System) file representing notes for each musical instrument in the timing of playing operation by partitioning notes based on the playing orders and the musical instruments.

31. The musical playing terminal as set forth in claim 30, wherein the musical performance processing means have musical data classified depending on the track of the musical instrument, display the electronic musical score on said displaying means and offer, in a single user mode, the designated sounds inputted by the user according to the electronic musical score and the background sounds to said musical playing means in the type of MIDI output message and, in a multi-user mode, said total playing(concert) data to said musical playing means.

32. The musical playing terminal as set forth in claim 30, wherein said electronic musical score is a digital electronic musical score, visually directs the playing orders by scrolling to the part of the musical score to be played according to playing time, where the complexity of the key input for each musical instrument is coordinated.

33. The musical playing terminal as set forth in claim 30, wherein said electronic musical score visually directs the playing orders by scrolling to the part of the musical score to be played according to playing time, where, to degrade the complexity of the key input for each musical instrument, the range of all the notes is confined to one octave by removing the octave element in notes and all the semi-tones are replaced by whole-tones, or, to upgrade the complexity of the key input, the range of all notes is extended to two to five octaves by increasing the number of input keys.

34. A network based accompaniment service system, comprising:
   accompaniment service providing means for providing accompaniment file, accompaniment service programs and accompanying functions for at least one user; and
   at least one song executing means connected with said accompaniment service providing means through communication networks for downloading said accompaniment file and said accompaniment service programs, wherein the musical performance file is a Virtual Orchestra System (VOS) file representing notes for each musical instrument in timing of playing operation by partitioning notes based on playing orders and the musical instruments, and wherein the VOS file is generated by classifying MIDI messages by type to get the necessary information from musical message stored in MIDI files and by converting delta time information in the MIDI file to absolute time information.

35. The network based accompaniment service system as set forth in claim 34, wherein said accompaniment service providing means provide a chorus function for plural users using said accompaniment file and said accompaniment service programs.

36. The network based accompaniment service system as set forth in claim 34, wherein said song executing means provide a vocal solo function or a chorus function, after downloading said accompaniment file and said accompaniment service programs.

37. The network based accompaniment service system as set forth in claim 34, wherein said accompaniment service providing means are connected with at least two local servers and provide said accompaniment file and said accompaniment service programs for each local server and wherein a vocal solo function for a singer or a chorus function for plural singers is carried out by one of said local servers or the chorus function for distributed singers is carried out by the associated local servers.

38. The network based accompaniment service system as set forth in claim 34, wherein said accompaniment file is a noraebang music file representing lyric texts, singing orders, and accompaniment sounds by inserting sync between the lyric texts and the beat of a VOS (Virtual Orchestra System) file, which represents notes for each musical instrument in a timing of playing operation by partitioning the notes based on the playing orders and the musical instruments.

39. The network based accompaniment service system as set forth in claim 34, wherein said accompaniment service providing means include:
   program storing means for storing said accompaniment service programs and, in response to service control means, providing accompaniment service programs to said service control means;
   musical file storing means for classifying and storing said accompaniment file based on genre and providing the accompaniment file requested by said at least one song executing means to said service control means;
   first networking means connected with said at least one song executing means for transmitting said accompaniment file and said accompaniment service programs to said at least one song executing means, and, in a chorus function, receiving personal singing(solo) data from said at least one song executing means and transmitting total singing(chorus) data to said at least one song executing means;
   service control means for controlling said accompaniment service, transmitting the accompaniment file and said accompaniment service programs requested by said at least one song executing means to said first networking means, said personal singing data to multiplex chorus means, and said total singing data to said first networking means, wherein said multiplex chorus means offers environments where said at least one song executing means play in chorus, and generating total singing data by integrating said personal singing data of plural singers; and
   storing means for storing information on said at least one song executing means and said accompaniment file stored in said file storing means and for storing evaluation data for each singer and whole chorus playing for a selected music.

40. The network based accompaniment service system as set forth in claim 39, wherein said at least one song executing means include:
   second networking means, connected with said accompaniment service providing means, for receiving said accompaniment file and said accompaniment service programs from said accompaniment service providing means, and, in the chorus function, transmitting said personal singing(solo) data to said accompaniment service providing means and receiving total singing (chorus) data from said accompaniment service providing means;
   musical file providing means for providing said accompaniment file received through said second networking means;
   displaying means for displaying the lyric texts and the singing orders;

user input means for getting a voice input of users according to the singing orders displayed on said displaying means;

accompaniment processing means for installing and executing said accompaniment service programs received through said second networking means, storing said accompaniment file, providing the lyric texts and the singing orders in said accompaniment file to said displaying means, and generating voice sounds of the singer inputted through said user input means and the accompaniment sounds excluding the voice sounds of the singer;

musical playing means for synthesizing the voice sounds of the singer with the accompaniment sounds from said accompaniment processing means; and output means for outputting the sounds played back by said musical playing means.

41. An accompaniment server providing accompaniment service through a communication network, comprising:

program storing means for storing accompaniment service programs;

musical file storing means for storing a accompaniment file classified by genres;

first networking means connected with at least one song executing means for transmitting said accompaniment file and said accompaniment service programs to said at least one song executing means;

service control means for receiving the accompaniment service programs from the program storing means and said accompaniment file from the musical file storing means in order to control said accompaniment service required by said at least one song executing means, and transmitting said accompaniment file and said accompaniment service programs, which are requested by said at least one song executing means, to said first networking means; and storing means for storing information on said at least one song executing means and said accompaniment file stored in said file storing means and for storing evaluation data for a performance result of a chorus playing for the selected music, wherein said accompaniment file is Virtual Orchestra System (VOS) file representing notes for a musical instrument in timing of playing operation by partitioning notes based on playing orders and the musical instrument, and wherein the VOS file is generated by classifying MIDI messages by type to get the necessary information from musical message stored in a MIDI file and by converting delta time information in the MIDI file to absolute time information.

42. The accompaniment server as set forth in claim 41, further comprising multiplex chorus means for offering musical environments where said at least one song executing means play in chorus for the selected music and generating total singing data by integrating personal singing data of plural users.

43. The accompaniment server as set forth in claim 42, wherein said accompaniment file is a noraebang music file representing lyric texts, singing orders, and accompaniment sounds by inserting sync between the lyric texts and a beat of the VOS (Virtual Orchestra System) file, which represent notes for the musical instrument in the timing of playing operation by partitioning notes based on the playing orders and the musical instrument.

44. The accompaniment server as set forth in claim 43, wherein the musical accompaniment processing means have musical data divided into the lyric texts, the singing orders, and the accompaniment sounds, display the lyric texts and the singing orders on said displaying means at a real time and offer, in a single user mode, the voice sounds according to the singing orders and the accompaniment sounds to said musical playing means in a type of MIDI output message, while, in a multi-user mode, said total singing (chorus) data to said musical playing means.

45. The accompaniment server as set forth in claim 41, wherein said first networking means are connected with said at least one song executing means through said communication network for transmitting said accompaniment file and said accompaniment service programs to said at least one song executing means, and, in a chorus function, receiving personal singing (solo) data from said at least one song executing means and transmitting total singing (chorus) data to said at least one song executing means.

46. The accompaniment server as set forth in claim 43, wherein service control means control said accompaniment service, transmit said accompaniment file and said accompaniment service programs requested by said at least one song executing means to said first networking means, personal singing data to multiplex chorus means, and said total singing data to said first networking means.

47. The accompaniment server as set forth in claim 43, wherein said at least one song executing means include:

second networking means, connected with an accompaniment service providing means, for receiving said accompaniment file and said accompaniment service programs from said accompaniment service providing means, and, in a chorus function, transmitting said personal singing (solo) data to said accompaniment service providing means and receiving total singing (chorus) data from said accompaniment service providing means;

musical file providing means f or providing said accompaniment file received through said second networking means;

displaying means for displaying the lyric texts and the singing orders;

user input means for getting a voice input of users according to the singing orders displayed on said displaying means;

accompaniment processing means for installing and executing said accompaniment service programs received through said second networking means, storing said accompaniment file, providing the lyric texts and the singing orders in said accompaniment file to said displaying means, and generating voice sounds of the singer inputted through said user input means and the accompaniment sounds excluding the voice sounds;

musical playing means for synthesizing the voice sounds with the accompaniment sounds from said accompaniment processing means; and output means for outputting the sounds played back by said musical playing means.

48. An accompaniment terminal providing accompaniment service, comprising:

first networking means, connected with an accompaniment service providing means through communication networks, for receiving an accompaniment file and accompaniment service programs from said accompaniment service providing means, wherein said accompaniment file is a Virtual Orchestra System (VOS) file representing notes for a musical instrument in timing of playing operation by partitioning notes based on playing orders and the musical instrument and wherein the VOS file is generated by classifying MIDI messages by type to get necessary information from a musical message stored in a MIDI file and by converting delta time information in the MIDI file to absolute time information;

musical file providing means f or providing said accompaniment file received through said first networking means;

displaying means for displaying lyric texts and singing orders in said accompaniment file;

user input means for getting a voice input of a singer according to the singing orders displayed on said displaying means;

accompaniment processing means for installing and executing said accompaniment service programs, storing said accompaniment file, providing the lyric texts and the singing orders in said accompaniment file to said displaying means, and excluding voice sounds of the singer inputted through said user input means and generating accompaniment sounds;

musical playing means for synthesizing the voice sounds of the singer and the accompaniment sounds from said accompaniment processing means; and output means for outputting the sounds played back by said musical playing means.

49. The accompaniment terminal as set forth in claim 48, wherein said first networking means are connected with said accompaniment service providing means through said communication networks for receiving said accompaniment file and said accompaniment service programs from said accompaniment service providing means, and, in a chorus function, transmitting personal singing (solo) data to said accompaniment service providing means and receiving total singing(chorus) data from said accompaniment service providing means.

50. The accompaniment terminal as set forth in claim 48, wherein said accompaniment service providing means provide a chorus function for plural users, which use said accompaniment file and said accompaniment service programs.

51. The accompaniment terminal as set forth in claim 48, wherein said accompaniment service providing means are connected with at least two local servers and, by providing said accompaniment file and said accompaniment service programs for each local server, provide a vocal solo function for a singer and a chorus function for plural singers at one of said local servers and for the distributed singers associating with local servers, using said accompaniment terminal.

52. The accompaniment terminal as set forth in claim 48, wherein said accompaniment service providing means include:

program storing means for storing said accompaniment service programs and, in response to service control means, providing said accompaniment service programs to said service control means;

musical file storing means for classifying and storing said accompaniment file based on genre, and provide said accompaniment file requested by said accompaniment terminal to said service control means;

second networking means connected with said accompaniment terminal for transmitting said accompaniment file and said accompaniment service programs to said accompaniment terminal, and, in a chorus function, receiving personal singing (solo) data from said accompaniment terminal and transmitting total singing (chorus) data to said accompaniment terminal, wherein said service control means control said accompaniment service, transmit said accompaniment file and said accompaniment service programs requested by said accompaniment terminal to said second networking means, said personal singing data to multiplex chorus means, and said total singing data to said second networking means;

multiplex chorus means for offering environments where said accompaniment terminal plays in chorus, and generating total singing data by integrating said personal singing data of plural singers; and storing means for storing information on said accompaniment terminal, accompaniment file stored in said file storing means, and evaluation data for each singer and whole chorus playing for a selected music.

53. The accompaniment terminal as set forth in claim 48, wherein said accompaniment file is a noraebang music file representing the lyric texts, the singing orders, and the accompaniment sounds by inserting sync between the lyric texts and the beat of the VOS (Virtual Orchestra System) file, which represents notes for each musical instrument in the timing of playing operation by partitioning notes based on the playing orders and the musical instruments.

54. The accompaniment terminal as set forth in claim 53, wherein the musical accompaniment processing means have musical data divided into the lyric texts, the singing orders, and the accompaniment sounds, display the lyric texts and the singing orders on said displaying means at a real time and offer, in a single user mode, the voice sounds according to the singing orders and the accompaniment sounds to said musical playing means in a type of MIDI output message, while, in a multi-user mode, said total singing(chorus) data to said musical playing means.

55. A network based musical performance service method using communication networks, comprising:

a first step of generating, in a musical performance server, a musical performance file representing notes for each musical instruments in a timing of playing operation by partitioning notes based on the playing orders and the musical instruments;

a second step of executing user authentication process when users try to log in for getting a musical performance service through said communication networks;

a third step of providing, in said musical performance server, said musical performance file and musical performance service programs to a musical playing terminal through said communication networks in case that the users are authorized in said second step; and a fourth step of providing, in said musical performance server, the musical performance service through said communication networks in case that the users are authorized in said second step, wherein said musical performance server provides a concert function for plural users.

56. The network based musical performance service method as set forth in claim 55, further comprising a fifth step of inquiring or modifying, in said musical performance server, user information in case the users are authorized in said second step.

57. The network based musical performance service method as set forth in claim 56, wherein said fifth step include:

a sixth step of transmitting said user information to said musical playing terminal in the inquiry and the modification of the user information;

a seventh step of displays, in said musical playing terminal, the user information on displaying means; and an eighth step of updating, in said musical performance server, user information in a database.

58. The network based musical performance service method as set forth in claim 55, wherein said musical playing terminal connected with said musical performance server through said communication networks provides a solo or the concert function, after downloading said musical performance file and said musical performance service programs.

59. The network based musical performance service method as set forth in claim 55, wherein said musical performance server is connected with at least two local servers and, by providing said musical performance file and said musical performance service programs for each local server, provide a solo function for a user and the concert function for the plural users at one of said local servers and for the distributed users associating with the local servers using said musical playing terminal.

60. The network based musical performance service method as set forth in claim 55, wherein said musical performance file is a VOS (Virtual Orchestra System) file representing notes for each musical instrument in a timing of playing operation by partitioning notes based on the playing orders and the musical instruments.

61. The network based musical performance service method as set forth in claim 60, wherein said musical playing terminal provides the solo, or the concert function based on said musical performance file for a selected music by downloading said musical performance service programs and said musical performance file from said musical performance server through said communication networks, installing and running said musical performance service programs.

62. The network based musical performance service method as set forth in claim 61, wherein a musical playing process of said musical playing terminal includes the steps of:
   downloading and storing said musical performance file through said musical playing terminal;
   reading, in response to user's request, the selected musical performance file stored in said storing means, displaying the notes of the music as an electronic score showing the playing orders through displaying means, and outputting background sounds excluding designated sounds; and,
   getting playing operation inputs of the user for each note according to the playing orders of notes in said electronic score on said displaying means;
   synthesizing the designated sounds operated by the user with the background sounds excluding the designated sounds.

63. The network based musical performance service method as set forth in claim 60, wherein said first step includes:
   a ninth step of classifying MIDI messages by type and storing the MIDI messages in a memory to get necessary information from musical messages stored in a MIDI file;
   a tenth step of converting delta time information in the MIDI file to absolute time information and classifying the users for each musical instrument;
   an eleventh step of generating an electronic score by simplifying a playing style; and,
   a twelfth step of generating a music file by changing a position of the notes, omitting the notes needed and coordinating playing complexity in said electronic score generated in the eleventh step.

64. The network based musical performance service method as set forth in claim 63, further comprising, after the eleventh step, a thirteenth step of inserting additional information (advertising message, image, or sound clip for some corporations, goods, music) to a complexity-coordinated musical score and deciding a time to show the additional information to the users.

65. The network based musical performance service method as set forth in claim 63, wherein said electronic musical score is a digital electronic musical score to visually direct the playing orders to be played according to a playing time, where a complexity of key inputs for each musical instrument is coordinated.

66. The network based musical performance service method as set forth in claim 64, wherein said electronic musical score is a digital electronic musical score to visually direct the playing orders to be played according to a playing time, wherein a range of all the notes is confined to one octave by removing an octave element in the notes to degrade a complexity of key inputs for each musical instrument, and wherein all semi-tones are replaced by whole-tones.

67. The network based musical performance service method as set forth in claim 64, wherein said electronic musical score is a digital electronic musical score to visually direct the playing orders to be played according to playing time, where a range of notes to be played can be extended to two to five octaves by increasing the number of input keys to upgrade a complexity of key inputs for each musical instrument.

68. The network based musical performance service method as set forth in claim 60, wherein said fourth step of musical performance service includes:
   a ninth step of determining if a solo service is to be given through said musical performance server;
   a tenth step of offering the solo service through said musical playing terminal based on a result of the ninth step; and
   an eleventh step of offering the solo service through said musical performance server based on the result of the ninth step.

69. The network based musical performance service method as set forth in claim 68, wherein said tenth step includes:
   a twelfth step of getting, in said musical playing terminal, a user input for selection of the music and the musical instruments to be played;
   a thirteenth step of displaying the notes for each musical instrument as an electronic score showing the playing orders through displaying means;
   a fourteenth step of receiving, in said musical performance processing means of said musical playing terminal, the users' playing operation input through input means in response to users' playing operation according to said electronic score displayed on said displaying means;
   a fifteenth step of outputting playing sounds by synthesizing said playing operation input with background sounds; and
   a sixteenth step of outputting, in said musical performance processing means, an achievement mark for the musical instrument of a selected musical performance file on said displaying means.

70. The network based musical performance service method as set forth in claim 68, wherein said eleventh step includes:
   a twelfth step that said musical performance server gets a user input for selecting music in said musical performance files;

a thirteenth step of searching said musical playing terminal for the selected music and providing said musical performance file for the selected music to said musical playing terminal in case that said musical playing terminal doesn't have the musical performance file for the selected music;

a fourteenth step of getting, in said musical playing terminal, a user input for said musical instruments for the selected music;

a fifteenth step of displaying the notes for said musical instrument as an electronic score showing playing orders through displaying means;

a sixteenth step of receiving, in said musical performance processing means of said musical playing terminal, the users' playing operation input through input means, in response to users' playing operation according to said electronic score displayed on said displaying means;

a seventeenth step of outputting playing sounds by synthesizing said playing operation input with background sounds;

an eighteenth step that said musical performance processing means output the user's achievement mark for the musical instrument of a selected musical performance file on said displaying means and, using network means, store the information on a musical performance in a database of said musical performance server; and a nineteenth step of confirming if the user wants to play another music, and, if the user wants to, returning back to said twelfth step.

71. The network based musical performance service method as set forth in claim 60, wherein said fourth step of musical performance service include:

a ninth step of getting an input for selecting music to be played in concert from a user logged on said musical performance server;

a tenth step of searching said musical playing terminal for a selected music, providing said musical performance file for the selected music to said musical playing terminal in case said musical playing terminal doesn't have the musical performance file for the selected music, and displaying a list of the musical instruments to be selected on each musical playing terminal;

an eleventh step of getting a list of the musical instruments selected for each user, executing the concert service, and storing the related information; and a twelfth step of confirming if the user wants to play another music, and, returning back to said ninth step in case that the users want to.

72. The network based musical performance service method as set forth in claim 71, wherein said ninth step includes:

a thirteenth step of communicating with one another for selection of the music to be played in the concert on said musical performance server;

a fourteenth step of getting an input for selection of the genre; and a fifteenth step of getting an input for the selection of the music.

73. The network based musical performance service method as set forth in claim 71, wherein said eleventh step includes:

a thirteenth step of getting the list of the musical instruments selected for each user;

a fourteenth step of displaying an electronic score of the selected music on displaying means of said musical playing terminal;

a fifteenth step of synthesizing playing operation inputs of each user;

a sixteenth step of calculating evaluation data in concert, and transmitting the evaluation data to each user through said musical performance server; and a seventeenth step of storing information in the concert to a database.

74. A network based accompaniment service method using communication networks, comprising:

a first step of generating, through accompaniment server, a musical performance file representing notes for each musical instrument in a timing of playing operation by partitioning notes based on the playing orders and the musical instruments, and an accompaniment file representing lyric texts, singing orders, and accompaniment sounds by inserting sync between the lyric texts and the beat to said musical performance file;

a second step of executing user authentication process when the users try to log in for getting accompaniment service through said communication networks;

a third step of providing, in said accompaniment server, said accompaniment file, accompaniment service program to said accompaniment terminal through said communication networks in case the users are authorized according to the result of said second step; and a forth step of providing, in said accompaniment server, a musical performance service through communication networks in case the users are authorized according to the result of said second step.

75. The network based accompaniment service method as set forth in claim 74, further comprising a fifth step of inquires or modifies, in said accompaniment server, user information in case the users are authorized according to the result of said second step.

76. The network based accompaniment service method as set forth in claim 75, wherein said fifth step includes:

a sixth step of transmitting said user information to said accompaniment terminal in the inquiry and the modification of user information;

a seventh step of displaying, in said accompaniment terminal, the user information on displaying means; and an eighth step of updating, in said musical performance server, the altered user information in a database.

77. The network based accompaniment service method as set forth in claim 74, wherein said accompaniment server provides a chorus function for plural users using said accompaniment file, and said accompaniment service programs.

78. The network based accompaniment service method as set forth in claim 74, wherein said accompaniment terminal connected with said accompaniment server through communication networks provides the solo or the concert function, after downloading said accompaniment file and said accompaniment service programs.

79. The network based accompaniment service method as set forth in claim 74, wherein said accompaniment server means are connected with at least two local servers and, by providing said accompaniment file and accompaniment service programs for each local server, provide a vocal solo function for a singer, a chorus function for plural singers at one of said local servers or the chorus function for the distributed singers associating with said local servers, using said accompaniment terminal.

80. The network based accompaniment service method as set forth in claim 74, wherein said accompaniment file is a noraebang music file representing lyric texts, singing orders, and the accompaniment sounds by inserting sync between the lyric texts and beat to the VOS (Virtual Orchestra System) file representing notes for each musical instrument in a timing of playing operation by partitioning notes based on the playing orders and the musical instruments.

81. The network based accompaniment service method as set forth in claim 80, wherein the vocal solo service of said forth step of accompaniment service includes:
  a ninth step of determining if the vocal solo service is to be given through said accompaniment server;
  a tenth step of offering the vocal solo service through said accompaniment terminal based on the result of the ninth step; and
  an eleventh step of offering the vocal solo service through said accompaniment server based on the result of the ninth step.

82. The network based accompaniment service method as set forth in claim 81, wherein said eleventh step includes:
  a twelfth step of getting, in said accompaniment server, a user input for selection of a song;
  a thirteenth step of searching said accompaniment terminal for the selected song, and providing said accompaniment file for the selected song to said accompaniment terminal in case said accompaniment terminal doesn't have the selected song;
  a fourteenth step of displaying the lyric texts and the singing orders for selected song through displaying means and outputting the background sounds;
  a fifteenth step of receiving, in said accompaniment processing means of said accompaniment terminal, the users' voice input through input means, in response to users' singing according to the singing orders displayed on said displaying means;
  a sixteenth step of synthesizing the users' voice and the accompaniment sounds and outputting it;
  a seventeenth step of outputting a user's achievement mark for the selected song on said displaying means and, using network means, storing the information on the selected song in a database of said musical performance server; and
  an eighteenth step of confirming if the user wants to play another music, and, if the users want to, jumping back to said twelfth step.

83. The network based accompaniment service method as set forth in claim 80, wherein the chorus service of said forth step of accompaniment service includes:
  a ninth step of getting an input for selection of the song to be played in chorus from a singer logged on said accompaniment server;
  a tenth step of searching said accompaniment terminal for the selected song, providing said accompaniment file for the selected song to said accompaniment terminal in case said accompaniment terminal doesn't have the selected song;
  an eleventh step of displaying the lyric texts and the singing orders through displaying means of said accompaniment terminal and outputting the accompaniment sounds;
  a twelfth step of getting the voice input from each user, executing the chorus service, and storing the related information; and
  a thirteenth step of confirming if the users want to play another song, and jumping back to said ninth step in case the users want to.

84. The network based accompaniment service method as set forth in claim 83, wherein said ninth step includes:
  a fourteenth step that the users logged on said accompaniment server communicate one another for selecting a song to be played in concert;
  a fifteenth step of getting an input for selection of a genre; and
  a fifteenth step of getting an input for selection of a song.

85. The network based accompaniment service method as set forth in claim 83, wherein said twelfth step includes:
  a fourteenth step of integrating the voice of each user and providing it to each the users;
  a fifteenth step that said accompaniment server calculates the evaluation data for the chorus playing, and transmits it to each user; and
  a sixteenth step of storing the information on the chorus playing in the database.

86. The network based accompaniment service method as set forth in claim 74, wherein said accompaniment terminal provides a vocal solo or a chorus function based on said accompaniment file for the selected music by downloading said accompaniment service programs and accompaniment file from said musical performance server through said communication networks, installing and running said musical performance service programs.

87. The network based accompaniment service method as set forth in claim 86, wherein said tenth step includes:
  a twelfth step of getting, in said accompaniment terminal, a user input for selection of the music and the musical instruments to be played;
  a thirteenth step of displaying the lyric texts and the singing orders through displaying means and outputting the background sounds;
  a fourteenth step receiving, in said accompaniment processing means of said accompaniment terminal, the users' voice input through input means, in response to users' singing according to the singing orders displayed on said displaying means;
  a fifteenth step of synthesizing the voice of users and the accompaniment sounds and outputting it; and
  a sixteenth step of outputting an achievement mark of the user for the selected music on said displaying means.

88. The network based accompaniment service method as set forth in claim 86, wherein the accompaniment playing process of said accompaniment terminal includes:
  a first step that said accompaniment terminal downloads said accompaniment file and stores them in storing means;
  a second step of reading, in response to user's request, the selected accompaniment file among said musical performance file stored in said storing means, displaying the lyric texts and the singing orders through displaying means, and outputting the accompaniment sounds excluding the voice of users;
  a third step of getting the voice input of the users according to the singing orders on said displaying means;
  a fourth step of synthesizing the voice of users and the accompaniment sounds and outputting it.

89. In the musical performance service system with processors, a computer readable medium storing program codes for realizing:
  a first function of generating, in a musical performance server, a musical performance file representing notes for each musical instrument in a timing of playing operation by partitioning notes based on the playing orders and the musical instruments;

a second function of executing user authentication process when users try to log in for getting a musical performance service through said communication networks;

a third function of providing, in said musical performance server, musical performance file, musical performance service programs to a musical performance terminal through said communication networks in case the users are authorized according to the result of said second function; and a forth function of providing, in said musical performance server, the musical performance service through said communication networks in case the users are authorized according to the result of said second function.

90. The computer readable medium storing program codes as set forth in claim 89, further realizing a fifth function of inquiring or modifying user information in case the users are authorized according to the result of said second step.

91. The computer readable medium storing program codes as set forth in claim 89, further realizing a fifth function that the musical performance server inquires or modifies the user information in case the users are authorized according to the result of said second function.

92. In the accompaniment service system with processors, a computer readable medium storing program codes for realizing:

a first function of generating, through accompaniment server, a musical performance file representing notes for each musical instrument in a timing of playing operation by partitioning notes based on the playing orders and the musical instruments, and an accompaniment file representing lyric texts, singing orders, and accompaniment sounds by inserting sync between the lyric texts and the beat to said musical performance file;

a second function of executing user authentication process when the users try to log in for getting accompaniment service through said communication networks;

a third function of providing, in said accompaniment server, said accompaniment file, accompaniment service program to said accompaniment terminal through said communication networks in case the users are authorized according to the result of said second function; and a forth function of providing, in said accompaniment server, a musical performance service through communication networks in case the users are authorized according to the result of said second function.

* * * * *